(12) United States Patent
Yamamoto

(10) Patent No.: US 7,531,065 B2
(45) Date of Patent: May 12, 2009

(54) DISTILLATION APPARATUS

(75) Inventor: Soichiro Yamamoto, Unionville (CA)

(73) Assignee: Uni-Ram Corporation, Markham, Ontario (CA)

( * ) Notice: Subject to any disclaimer, the term of this patent is extended or adjusted under 35 U.S.C. 154(b) by 430 days.

(21) Appl. No.: 10/493,119

(22) PCT Filed: Oct. 18, 2002

(86) PCT No.: PCT/CA02/01580

§ 371 (c)(1),
(2), (4) Date: Jun. 16, 2004

(87) PCT Pub. No.: WO03/035287

PCT Pub. Date: May 1, 2003

(65) Prior Publication Data

US 2005/0011742 A1     Jan. 20, 2005

(51) Int. Cl.
*B01D 3/10* (2006.01)
*B01D 3/42* (2006.01)
(52) U.S. Cl. .................. 202/160; 159/44; 202/181; 202/196; 202/205; 202/206; 203/1; 203/DIG. 18
(58) Field of Classification Search ............. 159/44; 202/160, 181, 196, 205, 206, 234, 267.1, 202/269; 203/1, 10, DIG. 18; 73/1.73; 392/394
See application file for complete search history.

(56) References Cited

U.S. PATENT DOCUMENTS

| | | | | |
|---|---|---|---|---|
| 3,646,727 A | * | 3/1972 | Wachsmuth | 95/22 |
| 5,082,535 A | * | 1/1992 | Oesch et al. | 202/170 |
| 5,334,291 A | * | 8/1994 | Gavlin et al. | 202/234 |
| 5,388,601 A | | 2/1995 | Mansur | |
| 5,827,374 A | | 10/1998 | Mansur | |
| 5,876,567 A | | 3/1999 | Yamamoto et al. | |
| 6,117,275 A | * | 9/2000 | Baumann | 203/1 |
| 6,279,587 B1 | | 8/2001 | Yamamoto | |
| 6,582,563 B1 | * | 6/2003 | Adam et al. | 202/83 |

FOREIGN PATENT DOCUMENTS

DE       3910013       10/1990

* cited by examiner

Primary Examiner—Virginia Manoharan
(74) Attorney, Agent, or Firm—Ladas & Parry LLP

(57) ABSTRACT

A fluid distillation apparatus includes at least one each of a fluid inlet port Through which the fluid to be distilled is transferred from a container containing the fluid to be distilled to distillation chamber, a fluid outlet port through which the distilled fluid is transferred to a container to hold the distilled fluid, an air supply port to which compressed air supply is to be connected, a power cord through which the electric power is supplied, preferably an outlet through which air pressure for fluid agitation is supplied to said container containing the fluid to be distilled, and preferably art outlet through which air pressure is supplied to a pump means for transferring the distilled fluid from the receiving container to the duty fluid container. The apparatus includes a debris draining system for automatically draining debris from said distillation tank.

14 Claims, 10 Drawing Sheets

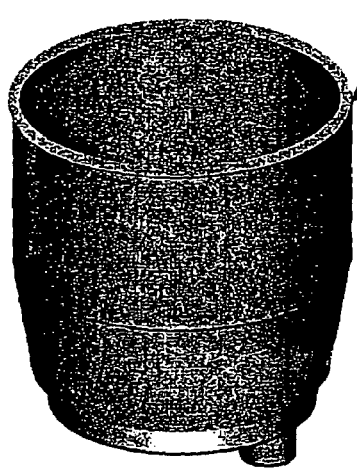
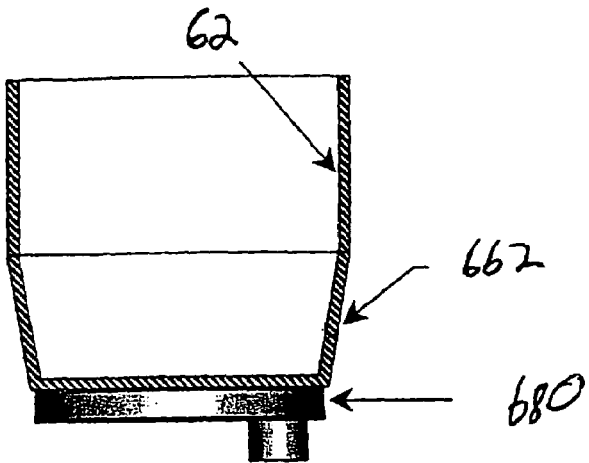
FIG 7A              FIG 7B
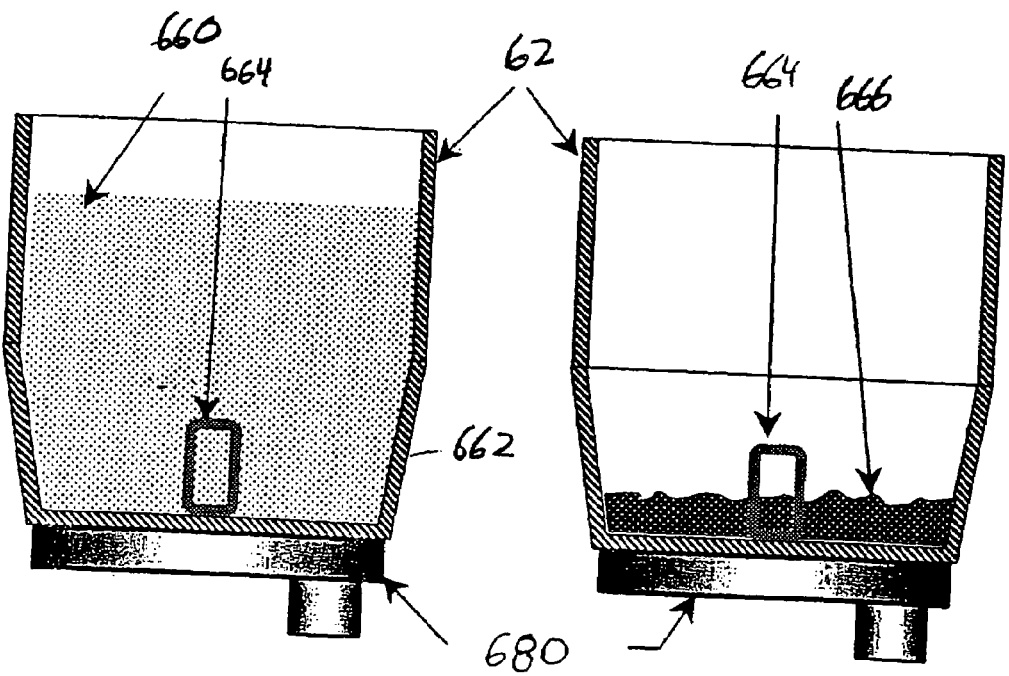
FIG 7C              FIG 7D

DISTILLATION APPARATUS

FIELD OF INVENTION

This invention relates to fluid distillation apparatus and in particular to fluid distillation apparatus programmed to perform automatic distillation processes.

BACKGROUND OF THE INVENTION

It is known to provide fluid distillation apparatus which is built into a object cleaning apparatus comprising a duty tank for retaining a contaminated fluid, a receiving tank for accepting a distilled fluid from the fluid distillation apparatus and a sink means in which objects are cleaned. Typically, the built-in fluid distillation apparatus, the duty tank, or the receiving tank is not easily separable and replaceable from the object cleaning apparatus. Typically the built-in distillation apparatus is for a batch distillation process and is not capable of automatically repeating the distillation process.

The built-in distillation apparatus typically does not employ electrically actuated (intrinsically safe) solenoid valves to control pneumatic devices required for automatic distillation operations.

The built-in distillation apparatus is designed to drain waste debris manually and does not employ pneumatically actuated valve for automatically draining waste debris from the distillation chamber.

Typically, the built-in distillation apparatus is constructed for use neither in the locations designated by applicable laws to be hazardous nor with any flammable fluid.

Known distillation apparatus are often monitored to ensure that they operate within desired parameters of pressure, fluid level and temperature in the tanks and conduits between said tanks, however, once abnormalities are detected, no error messages are displayed and manual corrective action is required in order to restore function within desired parameters.

It is further known that typical distillation apparatus comprises a distillation tank which is heated indirectly through oil jacket which surround the distillation tank, thereby causing a need to periodically change said oil.

It is further known that typical distillation apparatus are not capable of distilling a mixture of fluids and automatically separating the distilled fluids to more than one receiving container.

It is further known that typical distillation apparatus are not equipped with a means capable of one-way or two-way communication with any remote devices such as remote alarm apparatus, remote fire extinguisher, remote diagnostic apparatus.

SUMMARY OF INVENTION

It is an object of the invention to provide an improved fluid distillation apparatus and components thereof.

In accordance with an aspect of the invention a fluid distillation apparatus is removably built into a object cleaning apparatus which further comprises a duty tank for retaining contaminated fluid, a receiving tank for receiving the distilled fluid from the distillation apparatus and a sink means in which the objects are cleaned.

In accordance with a further aspect of the invention a fluid distillation apparatus comprises at least one each of a fluid inlet port through which the fluid to be distilled is transferred from a container containing the fluid to be distilled to distillation chamber, a fluid outlet port through which the distilled fluid is transferred to a container to hold the distilled fluid, an air supply port to which compressed air supply is to be connected, a power cord through which the electric power is supplied, preferably an outlet through which air pressure for fluid agitation is supplied to the said container containing the fluid to be distilled, and preferably an outlet through which air pressure is supplied to a pump means for transferring the distilled fluid from the receiving container to the duty fluid container.

In accordance with a further aspect of the invention a fluid distillation apparatus, the duty tank, and the receiving tank are built into the object cleaning apparatus in such way that any one of said three components can be removed from and re-installed to the object cleaning apparatus easily and within a short period of time.

In accordance with a further aspect of the invention a fluid distillation apparatus is programmed to automatically repeat a fluid distillation process consisting of a filling cycle in which distillation chamber is filled with the fluid to be distilled, a boiling cycle in which the fluid is evaporated and cooled, and a debris drain cycle in which the waste debris is drained.

In accordance with an aspect of the invention there is provided a fluid distillation apparatus which may be adapted to be used with an object cleaning apparatus.

In accordance with an aspect of the invention there is further provided a fluid distillation apparatus comprising a distillation chamber, a fluid inlet port in communication by conduit means with the duty tank, a debris container for accumulating debris from the distillation chamber, a fluid outlet port in communication by conduit means with the receiving tank for receiving distilled fluid, the receiving tank itself being in communication by conduit means with the duty tank. Pumps are operatively connected to the conduit means to draw fluid between tanks. The fluid distillation apparatus (also referred to as an object cleaning apparatus), such that contaminated fluid may be fed from the object cleaning apparatus to the duty tank, where the contaminated fluid may be run through a recycler distillation program which acts to clean the fluid. Distilled fluid may then be fed back to the object cleaning apparatus for further use. Furthermore, the entirety of the fluid distillation apparatus may be removed from its retaining cabinet and or connection with a object cleaning apparatus as desired.

In accordance with a further aspect of the invention, there is provided a fluid distillation apparatus programmed to repeat a distillation cycle for a set amount of fluid to be distilled or for a set number of distillation cycles.

The fluid distillation apparatus program uses fluid level and temperature sensors and preferably a pressure sensor positioned to detect conditions within the tanks and conduit means, to activate or deactivate transfer pumps which are operatively connected to the conduit means between the tanks which draw fluid between tanks. Heating means and cooling means are provided which regulate the temperature of the distillation chamber. The fluid distillation apparatus is programmed to interrupt the cycle in the event of detection of abnormalities in temperature, fluid level and preferably pressure by the respective sensors.

In accordance with a further aspect of the invention there is provided an automatically repeating distillation process of a fluid to be distilled, the process comprising the steps not necessarily in same sequence of: optionally agitating the fluid to be distilled, transferring the said fluid into a distillation chamber from a tank containing the said fluid, distilling the said fluid in the distillation chamber while transferring the distilled fluid to a receiving container, optionally cooling the distillation chamber to the pre-determined temperature, draining waste debris from the distillation chamber into a debris container by opening a debris drain valve, optionally transferring the distilled fluid from the receiving tank to the duty tank or other preferred tank, and repeating these steps until the fluid has been completely distilled, or the pre-set number of times or volume of the fluid has been reached, or an abnormality is detected by the continuous self diagnostic apparatus, whichever may occur first, and finally cooling the distillation chamber and the related components to a temperature appropriate for the next distillation operation.

In accordance with a further aspect of the invention, the fluid distillation apparatus employs features where a vacuum pump is automatically activated to create vacuum in the distillation chamber only when evaporation conditions indicate within a pre-determined period of time the requirement of vacuum to reduce the boiling point. This design will prevent the unnecessary use of a vacuum pump as most of the fluids can be distilled without application of vacuum to reduce the boiling point.

In accordance with a further aspect of the invention, the fluid distillation apparatus employs features where at least one pneumatic device is controlled by solenoid valve which is actuated by intrinsically safe electric power and is located outside of the explosion proof housings as described herein.

In accordance with a further aspect of the invention, the fluid distillation apparatus employs feature where a heater unit is installed in an explosion proof housing attached directly to the bottom of said distillation tank thus improving heating speed and also eliminating need for oil changes.

In accordance with a further aspect of the invention, the fluid distillation apparatus employs features where one or more flow boosters are used in conjunction with the said solenoid valves to increase the volume of air flow that can be controlled by the solenoid valve as described herein.

In accordance with a further aspect of the invention, the fluid distillation apparatus employs features where a computer board with built-in control switches or with a separate key pad is intrinsically safe and located outside of explosion proof housings as described herein.

In accordance with a further aspect of the invention, the fluid distillation apparatus employs features where a computer board is located inside of an explosion proof housing and a separate intrinsically safe key pad is located outside of the explosion proof housings as described herein.

Preferably the fluid distillation apparatus employs features where the computer board contains one or more microprocessors and one or more LCD or LED display capable of displaying messages or signals as described herein. Many LED lights may be used to display messages or signals. For example, more than two LED lights flash in the pre-determined manners to indicate the error codes.

Preferably the computer board of the fluid distillation apparatus employs features where the operator can select, language of display, temperature displayed in Centigrade (° C.) or Fahrenheit (° F.), one or more maximum boiling temperatures, strength of heater power, number of automatically repeated cycles, agitation cycle turned on or off, vacuum distillation turned on or off, desired starting date and time. In case of the fluid distillation apparatus to produce more than one distilled product which is discussed herein later, more than one maximum boiling temperature and heater power strength can be selected for each distillation cycle. Preferably the computer board is provided with one or more terminals to accept digital or analog input signals as described herein.

Preferably the computer board is provided with one or more terminals to send out digital or analog output signals as described herein In accordance with a further aspect of the invention, a fluid distillation apparatus is explosion proof and includes features which improve the safe operation of the fluid distillation apparatus such as an auto repeating fluid distillation apparatus described herein.

The fluid distillation apparatus employs features where one of the explosion proof housings contains more than one component such as a power control board, a non-explosion proof fan motor, a magnetic interference filter unit, a re-settable safety switch, etc. as described herein.

In accordance with a further aspect of the invention, a fluid distillation apparatus employs features where one of the explosion proof housings contains one or more heater elements, one or more thermostats and connector terminals as described herein.

Such thermostat(s) may be a non re-settable type(s) or re-settable type(s) which may be re-set from the outside of the explosion proof housing as described herein.

In accordance with a further aspect of the invention, a fluid distillation apparatus employs features where all outlets of the explosion proof housing are provided with a sealed connection means, which functions as fume and flame barrier as will be described herein.

In accordance with a further aspect of the invention, a fluid distillation apparatus employs features where the explosion proof housing containing a heater element is connected to another explosion proof housing containing a fan motor and a power control board by means of explosion proof connector(s) and fitting(s).

In accordance with a further aspect of the invention, a fluid distillation apparatus employs features where the power control board is located inside the explosion proof housing and has more than one intrinsically safe barrier to supply the intrinsically safe power to electric components located outside of the explosion proof housing as described herein.

In accordance with a further aspect of the invention, a fluid distillation apparatus employs features where the power control board contains one or more intrinsically safe fuses which are attached to the power board by a permanent means such as soldering and can not be replaced easily or by a removable method such as fuse holders.

In accordance with a further aspect of the invention, a fluid distillation apparatus may employ both electricity and the compressed air as a source of energy for the function of the fluid distillation apparatus as described herein.

In accordance with yet a further aspect of the invention, an outer safety cover is provided over the lid of a distillation chamber of the invention so that hot liquid accidentally leaking or splashing out from the distillation chamber may be contained. Such safety cover may include large holes in its rear to release any accumulated pressure. The cover may cover the distillation chamber or the entirety of the fluid distillation apparatus assembly unit. In accordance with yet a further aspect of the invention, an outer safety cover is provided with automatic locking means to prevent the outer safety cover from being opened during operation of the distillation cycle.

In accordance with a further aspect of the invention there is provided a distillation chamber for use with an auto repeating fluid distillation apparatus, the tank being of unique construction having means to improve the heat conductivity of the tank. An embodiment of the distillation chamber, which is a double shell tank, filled with a heat conductive material is described and illustrated below.

In accordance with a further aspect of the invention there is provided a distillation chamber, for use with an auto repeating fluid distillation apparatus, which has a drain hole in the bottom and the bottom is preferably sloped toward the center to improve draining of the debris.

In accordance with a further aspect of the invention there is provided a distillation chamber for use with fluid distillation apparatus and in particular an auto repeating fluid distillation apparatus, the tank having improved means to remove accumulated debris from the tank. This feature may be used in the auto-repeating recycler of this invention but is also useful Where the debris is not liquid and must be removed manually. This design may be used in a fluid distillation apparatus which is not automatically repeating or which automatically repeats the distillation cycle up to two or three times only. If it is repeating 3 cycles, the boiling temperature is lowered by 20 to 30° C. during the first two cycles so that the debris still contains some fluid and does not solidify. In the last cycle, the temperature is raised and additional heating time is provided to help solidify the debris and thus ease the removal of said debris.

In accordance with a further aspect of the invention, there is provided the means to monitor the level of fluid in a distillation chamber comprising a differential pressure sensor, being connected to the distillation chamber or the lid of the distillation chamber, capable of detecting difference of air pressure between two level monitor tubes, one of which is dipped into the fluid in the distillation chamber as is described herein below.

In accordance with a further aspect of the invention, there is provided the means to monitor the level of fluid in a distillation chamber and preferably in other fluid containers, comprising a magnet attached to a stem of a float ball and a lead switch for detecting the magnetism.

In accordance with a further aspect of the invention, there is provided means to monitor the level of fluid in a debris container and in a container receiving distilled fluid from the distillation chamber. Although electric pressure sensors are used in the example, a float type or many other types of level sensors may be used.

In accordance with a further aspect of the invention, there is provided means to continuously monitor the pressure of compressed air supplied to a fluid distillation apparatus. There is provided means to continuously monitor the positive and negative pressure at the inside of a distillation chamber and the vapor passages. Preferably the automatically repeating fluid distillation apparatus employs a thermostat or a thermocouple attached to the condenser to detect overheating.

In accordance with a further aspect of the invention an automatically repeating fluid distillation apparatus employs a vapor sensor positioned near the distillation chamber to detect vapor leakage.

In accordance with a further aspect of the invention, an automatically repeating fluid distillation apparatus may be programmed to produce separately distilled products with different boiling points from one original fluid mixture.

In accordance with a further aspect of the invention, a fluid distillation apparatus comprises a means for enabling one-way or two-way communication with one or more a remote apparatus such as a remote fire extinguishing apparatus, a remote diagnostic apparatus, a remote alarm apparatus preferably with auto. phone dialing capability, etc.

In accordance with a further aspect of the invention provided is an object cleaning apparatus comprising in modular construction: a fluid distillation apparatus as described herein, a cleaning sink having at least one opening at bottom; a base cabinet having at least one opening; a duty fluid tank for holding fluid used for cleaning object(s); a clean fluid tank for holding distilled fluid; a means for cleaning object(s) comprising at least a brush, a spigot, a means for applying fluid onto object(s) or fluid flow line, a means for controlling fluid flow to said means for cleaning object(s); a pump means for transferring distilled fluid to duty fluid tank; a means for transferring fluid from duty cycle fluid container to said means for cleaning object(s), a fluid flow line between said duty fluid tank and fluid inlet port of said fluid distillation apparatus; and a fluid flow line between said clean fluid container and fluid outlet port of said fluid distillation apparatus.

In accordance with a further aspect of the invention provided is an automatic object cleaning apparatus with a built-in fluid distillation apparatus as described herein comprises in modular construction, a fluid distillation apparatus; a cleaning chamber for holding objects to be cleaned, having at least one opening through which said objects are moved into and out of said cleaning chamber; a means for closing (and opening) said opening comprising at least one door, a means for moving said objects within said cleaning chamber in horizontal, vertical, rotational direction in predetermined manner (and for predetermined length of time); a means for automatically cleaning objects inside said cleaning chamber by forcing movement of either one or both of said objects or fluid which is heated or not heated; a duty fluid tank for containing fluid used for cleaning object(s); a means for transferring said fluid from said duty fluid tank to said means for automatically cleaning objects; a clean fluid container for holding distilled fluid; a means for transferring distilled fluid from said clean fluid container to said duty cycle fluid container; a fluid flow line between said duty cycle container and fluid inlet port of said fluid distillation apparatus; a fluid flow line between said clean fluid container and fluid outlet port of said fluid distillation apparatus; and a means for controlling automatic cleaning and related functions comprising at least one electric or electronic control device.

BRIEF DESCRIPTION OF THE DRAWINGS

FIG. 7A is a perspective view of an embodiment of a distillation chamber in accordance with the invention;

FIG. 7B is a section view of the embodiment of the distillation chamber of FIG. 7A in accordance with the invention;

FIG. 7C is a section view of the embodiment of the distillation chamber of FIG. 7A before distillation;

FIG. 7D is a section view of the embodiment of the distillation chamber of FIG. 7A after distillation;

DETAILED DESCRIPTION OF THE EMBODIMENTS OF THE INVENTION

The following description, by way of example, describes and illustrates each aspect of the invention mentioned above.

Figure 1:
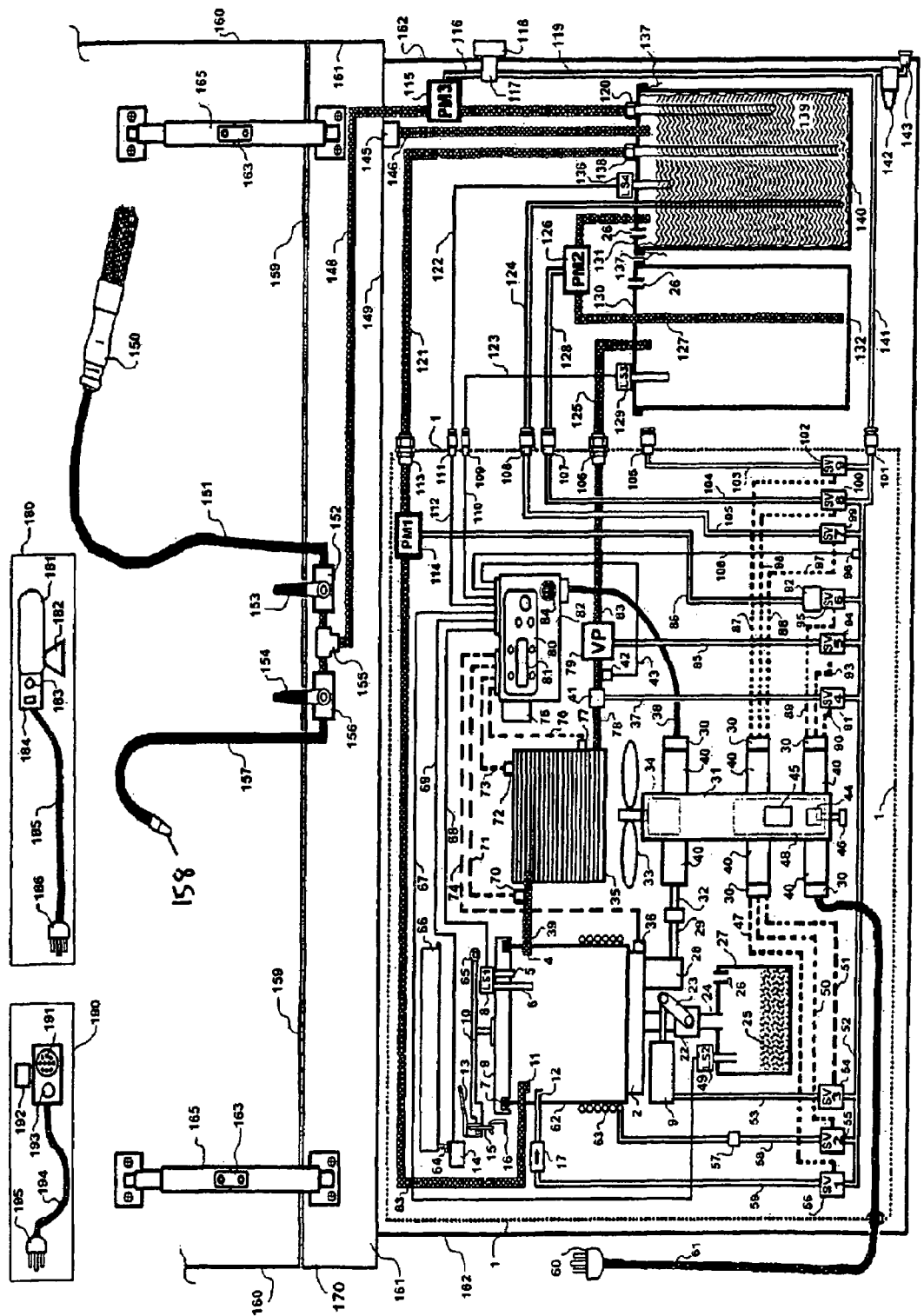
FIG. 1 is a schematic view of a preferred embodiment of an auto repeating fluid distillation apparatus according to the invention, as removably built-in within an object cleaning apparatus.

Shown in FIG. 1 is an embodiment of a fluid distillation apparatus adapted for use with a manual object cleaning apparatus. In the embodiment shown in FIG. 1, an automatic repeating fluid distillation apparatus 1 is adapted to the Manual Object cleaning apparatus 170. The recycler and the object cleaning apparatus are preferably electrically and pneumatically powered, so that the fluid 139 in the Duty tank 140 contaminated through the use of the Manual Object cleaning apparatus 170 may be automatically distilled by the Fluid distillation apparatus 1 when required.

The Fluid distillation apparatus 1 is installed inside the Base Cabinet 162 of the Manual Object cleaning apparatus 170 and is connected to the various parts of the Manual Object cleaning apparatus 170 at inside of the Base Cabinet 162 by means of connectors 105, 106, 107, 108, 109, 111, and 113 which are preferably designed to enable easy and quick connection and disconnection.

This unique modular construction of the Recycling Manual Object cleaning apparatus 170 offers easy access to various components of the Object cleaning apparatus such as the Receiving Tank 132, the Duty tank 140, the Transfer Pump PM2 128, the Object cleaning apparatus Pump PM3 115, the Pressure Regulator 142 accommodated within the Base Cabinet 162 for the maintenance and service work. The Automatically repeating fluid distillation apparatus unit 1 as a whole can also be easily removed or reinstalled for service and maintenance work where required.

An embodiment of a object cleaning apparatus which may be used with the fluid distillation apparatus is shown in FIG. 1. The Manual Object cleaning apparatus 170 consists of the Lid Assembly 160, the Sink Assembly 161 and the Base Cabinet 162.

The Lid Assembly 160 is attached to the Sink Assembly 161 preferably with the hinges 159. The Lid Stay 165 includes a fusible link 163 attaching the Lid Assembly 160 and the Sink Assembly 161 in such manner that the lid assembly 160 may be secured in either the closed position or an open position. In case of fire in Sink Assembly 161, the Fusible Link 163 is formed of suitable material such that it will melt and therefore allows the Lid Assembly 160 to close down on the Sink Assembly 160 by it's own weight.

The Base Cabinet 162 includes a door or doors to allow easy access to all components such as the Fluid distillation apparatus Unit 1, the Receiving Tank 132, the Duty tank 140, the Transfer Pump PM2 128, the Object cleaning apparatus Pump PM3 115, the Pressure Regulator 142 and all other components accommodated within the Base Cabinet 162.

Preferably Sink Assembly 161 is installed on the top of the base cabinet 162 and the bottom of the sink assembly 161 is tapered toward the drain hole to which the Strainer 145 is removably installed to prevent the debris of larger size from going into the Duty tank 140 through the Drain Pipe 146. The spigot 158 is attached to the end of the Flexible conduit 157.

Provided is a mechanical timer 118 which when turned on by means of an external knob, keeps the Timer Air Valve 117 open for the pre-determined period of time (e.g. 15 minutes) set by the Timer, allowing the Washer Pump PM3 115 to draw the fluid 139 from the Duty tank 140 through the Suction Pipe 120 and to feed it to the T-Connector 155 through the fluid supply Hose 148. The fluid is further supplied to the Flo-through Brush 150 or the flexible conduit 157, or both depending on how the Flow Control Valves 152 and 156 are adjusted by their Handles 153 and 154, so that the Flo-through brush 150 or the Spigot 158, or both may be used for the manual washing operation.

The fluid contaminated with grease, oil, dirt, etc. during the manual washing operation flows back into the Duty tank 140 through the Strainer 145 and the Drain Pipe 146.

Preferably the Duty tank 140 is large (typically 20 to 30 gallon capacity) and typically much less than this maximum capacity is utilized. For instance, typically 15 gallons of fluid is used in the Duty tank 140. Using less than the capacity of the tank is preferably because the amount of contaminant which enters into the Duty tank 140 gradually increases the fluid level in the Duty tank 140. As the level goes up, the air inside the tank is pushed out through the Air Breather Hole 26. Debris consisting of small solid particles such as dust, soil, rust, metal chips, etc. which pass through the Strainer 145 tend to settle in the bottom of the Duty tank 140. However, such debris is preventing from accumulating in a significant amount given that the fluid distillation apparatus 1 removes the contaminated fluid and the debris after the agitation cycle as will be described below.

In order to enable easy access to the inside of tanks for cleaning operation, the Receiving Tank 132 and the Duty tank 140 are provided with the Removable Lid 130 and 131 respectively.

To further facilitate cleaning of the inside of the Duty tank 140 and removal of debris, preferably Liner Bag 137 is installed in the Duty tank 140 before fluid is first filled.

Figure 2:
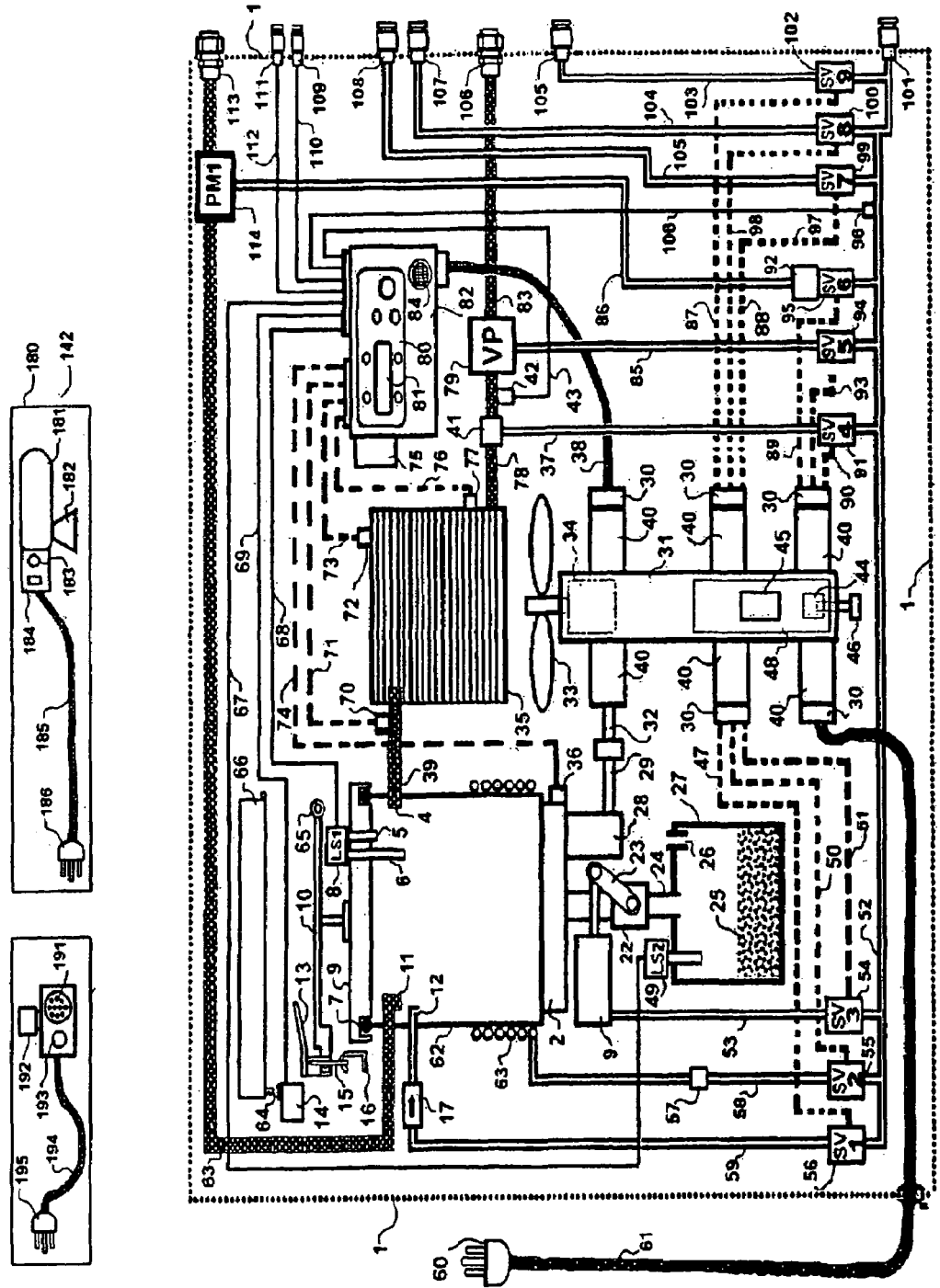
FIG. 2 is a schematic view of an embodiment of an auto repeating fluid distillation apparatus according to the invention, ready to be connected to external apparatus which generates contaminated fluid.
Figure 3:
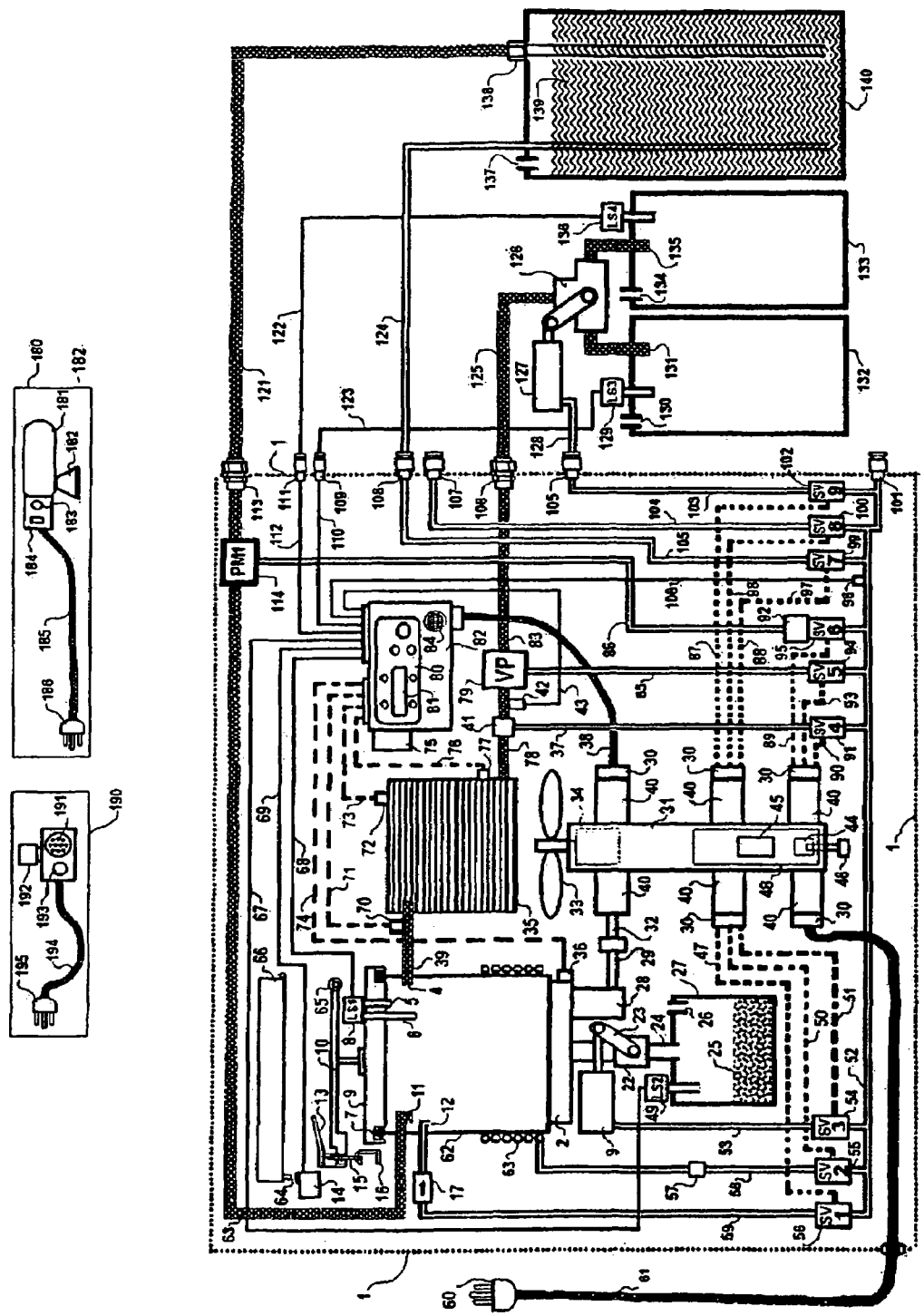
FIG. 3 is a schematic view of an embodiment of an auto repeating fluid distillation apparatus according to the invention, used to separate two products with different boiling points from one original mixture of fluids.

Shown in FIG. 2 is an embodiment of the auto-repeating Fluid distillation apparatus in isolation, designed to automatically repeat the distillation cycle. This embodiment of the auto repeating Fluid distillation apparatus is also illustrated in FIGS. 1 and 3 being used in two separate applications, namely with a object cleaning apparatus (as described above) and adapted to produce separately distilled products from one source as will be described below. The distillation cycle comprises the following steps:

a) a) agitating the contaminated fluid in preparation for the next phase, b) b) transferring the contaminated fluid or liquid from one source (such as container 140, reservoir, etc,) into the Distillation chamber 62, c) c) distilling the contaminated fluid and returning the distilled fluid back to the same source or to another container, d) d) automatically draining the Debris from the Distillation chamber 62 into the Debris Container 27, and e) e) cooling the Distillation chamber 62 to the degree appropriate for the next cycle.

The recycler may be programmed to allow the distillation cycle to be automatically repeated for a certain desired number of cycles, or until the desired total volume of the contaminated fluid has been processed or an error condition in the processing has been detected.

With reference to FIGS. 1 to 3, the function and construction of a typical embodiment of the fluid distillation apparatus is further explained as follows. Preferably, electric power is supplied to the Fluid distillation apparatus Unit 1 via Power Plug 60 and Power Cord 61.

The compressed air is supplied to the Part Washer 170 through the air inlet fitting 143.

The compressed air is further supplied to the Fluid distillation apparatus 1 by connecting the Air Hose 141 of the Object cleaning apparatus 170 to the Quick Connector 101 of the Fluid distillation apparatus Unit 1 after being adjusted to proper air pressure by the Pressure Regulator 142. As soon as the electric power is supplied to the Auto-repeating Fluid distillation apparatus 1, the LCD Display 81 will indicate various information including the phase of operation, such as "Agitation Cycle", "Tank Filling" "Heating", "Draining", "Cooling" etc. together with the current temperature, the set point temperature, Number of cycle, etc. as well as any error message applicable. For example, during the heating cycle, the LCD Display would show the following three messages: "Now Heating", "Cycle 3 of 10" and "T=123C, SP=200C", alternatively for every 5 seconds. (Note: "T" is the temperature at the Heater Thermo-couple 62 and "SP" is the set point temperature.)

Before starting the distillation operation, various parameters such as the maximum boiling temperature called "set point", number of the auto-repeating cycles desired, the preferred language such as English, French, German, Spanish, Japanese, etc. and the Celsius or Fahrenheit temperature to be displayed on the LCD 81, the auto-start time and the days of week if the scheduled auto-start of operations is desired, turning on/off of the agitation apparatus, and the Vacuum apparatus, etc. must be selected and set up into the Computer Board 82 by means of the switches on the Control Panel 80.

Upon pressing the "Start Button" on the Control Panel 80, a self diagnostic program provided within the Computer Board 82 commences checking: the continuity of the circuit of the Heater 2, cooling apparatus including the Fan Motor 34 fitted to inside of the Explosion Proof Housing 31 (which shall be described in further detail below), the Heater Thermocouple 36, the Vapor Tube Thermocouple 70, all Solenoid Valves SV1 56, SV2 55, SV3 54, SV4 91, SV5 94, SV6 95, SV7 99, SV8 100 and SV9 102, the level of the Distillation chamber 62 (by the Level Sensor LS1 8), the Debris Container 27 (by the Level Sensor Two (LS2) 60), the Receiving Tank 132 (by the Level Sensor Three LS3 129), and the Duty Tank 140 by the Level Sensor 4 136.

The self diagnostic program further checks the temperature at the Heater Thermocouple 36, the Heater Thermostat 6, Vapor Tube Thermocouple 70, the Condenser Thermostat 72, existence of the air pressure of the specified value at the Pressure Sensor 96.

If any abnormality has been detected, the Buzzer 84 will sound and the LCD Display 81 will show error messages urging the possible corrective action to be taken.

Unless any abnormality has been detected, the agitation cycle is activated for a preset pre-determined period of time (e.g. few seconds) by opening the Solenoid Valve SV7 99 and introducing air pressure through the Air Hoses 105 and 124 into the bottom of the Duty tank 140 which contains the Fluid 139 contaminated as the result of the washing operation of the Object cleaning apparatus 170. (Note: If a programmed automatic start operation has been chosen, this process will not start until the first schedule start time is reached).

During the next tank filling cycle, the Solenoid Valve SV6 95 is opened and air pressure is supplied, via the Air Flow Booster 92, to the Tank Filler Pump PM1 114 which transfers the contaminated fluid 139 from the Duty tank 140 through the Suction Pipe 138, the Fluid Hose 121 and the Tank Filler Hose 63 into the Distillation chamber 62. The Tank Filler Pump PM1 114 is stopped when the Level Sensor LS1 8 detects full level of the fluid in tank 62 or after the pre-determined period of time (e.g. 5 minutes) whichever occurs first. (Note: The predetermined period of time may occur first when there may not be enough fluid left in the Duty tank 140 to fill the Distillation chamber 62.)

During operation of the recycler, the pressure inside the distillation chamber 62 tends to vary quite widely from negative values (vacuum) to positive values. As such conventional pressure sensor like LS2 49, LS3 129 and LS4 138 cannot be used at the position of Level Sensor LS1 in the distillation chamber 8. Therefore, the differential pressure sensor which detects the difference of the pressure between the Short Tube 5 and the Long Tube 6 is employed so that as soon as the fluid level goes up above the low end of the Longer Tube 6 and a small pressure is created, the Filler Pump (PM1 114 is turned off.

The next heating cycle is initiated, regardless of whether the Distillation chamber 62 is full or not, when the Power Control Board 48 installed inside the Explosion Proof Housing 31 starts supplying power to the Heater Unit 2 through wires which pass through the Sealing Fitting 40, the Conduits 32 and 29 and the Heater Terminal Housing 28.

The Fan Motor 34 installed inside the Explosion Proof Housing 31 is also turned on at the same time and the Fan Blades 33 start rotating to cool the Condenser 35. The temperature of the Distillation chamber 62 measured by the Heater Thermocouple 36 starts rising. If the temperature increase detected by the Heater Thermocouple 36 is less than the set pre-determined value within the predetermined period of time (e.g. 3.C in 5 minutes), the heating cycle is discontinued and error message indicating the heater circuit problem will be displayed on the LCD 81.

If the temperature increase detected by the Heater Thermocouple 36 is more than the pre-determined value within the predetermined period of time (e.g. 50.C in 5 minutes), the heating cycle is discontinued and an error message indicating possibility of the absence of fluid or an insufficient amount of the fluid in the Distillation chamber 62 will be displayed on the LCD 81.

If neither of the error conditions is detected, the Heater (2) continues heating the Fluid and the Solenoid Valve SV5 94 is opened to start the Vacuum Pump 79 for distillation under vacuum. The vacuum pump may be turned on only when no evaporation has been detected within the pre-determined period of time (e.g. 30 minutes), as the SP is too low for the distillation of the fluid being distilled. This design will prevent the unnecessary use of the vacuum pump as most of the fluids can be distilled without application of vacuum to reduce the boiling point. The Pressure Sensor 42 continuously monitors the value of the vacuum and if the vacuum falls below the pre-determined value (e.g. 25" Hg), heating cycle is stopped and an error message indicating the insufficient vacuum will be shown on the LCD 81.

When a component in the fluid inside the Distillation chamber 62 reaches it's boiling point, the fluid vapor starts flowing through the Vapor Outlet Tube 68 into the Condenser 35 where it is liquified to be pure fluid without contamination. The fluid flows into the Receiving Tank 132 of the Object cleaning apparatus 170 through the Fluid Hoses 78, 83 and 125. When the temperature at the Heater Thermo-couple 36 detects the temperature which is lower by the steps of the pre-determined values (e.g. 9.C, 6.C and 3.C below the set point), the Computer Board 82 reduces the heater power by the steps of the pre-determined values (e.g. 10%, 20% and 30%).

When the temperature at the Heater Thermo-couple 36 detects the set point temperature, the Heater is turned off and turned on again when the temperature at the Heater Thermo-couple goes down to 1.C below the set point temperature. This on and off control of the heater will continue until the pre-determined period of time (e.g. 20 minutes) expires or until after the Vapor Tube Thermo-couple 70 detects that all fluid in the Distillation chamber 62 with the boiling point lower than the maximum boiling temperature which was set up initially has been evaporated.

If the Vapor Tube Thermo-couple does not detect the pre-determined temperature within the pre-determined period of time (e.g. 70.C within 90 minutes), the heating will stop and an error message indicating "too low set point" will be displayed on the LCD 81. The completion of evaporation is detected when the temperature at the Vapor Tube Thermo-couple 70 exceeds the pre-determined value (e.g. 70.C) and goes down to below the pre-determined value (e.g. 70.C).) Subsequent to the completion of the Heating cycle, the Vacuum Pump 79 is turned off and the Solenoid Valve SL1 58 is opened to start supplying air pressure through the One-way Check Valve 17 into the Distillation chamber 62. At the same the Solenoid Valve SL4 91 is also opened to shut off the Valve 41. After the pre-determined period of time (e.g. 1 minute) the pressure inside of the Distillation chamber 62 increases and the Solenoid Valve SL3 54 is opened to actuate the Air Cylinder 9 which moves the Handle 23 of the Drain Valve 22 to the open position so that the debris remaining at the bottom of the Distillation chamber 62 is drained under a pressure into the Debris Container 27.

After the pre-determined period of time (e.g. 2 minutes), the Solenoid valves SV1 56 and SV4 91 are closed at the same time as the Solenoid Valve SV3 54 is closed to return the Handle 23 of the Debris Drain Valve 22 to the closed position. The Solenoid Valve SV2 55 is then opened to introduce the flow of compressed air to the Tank Cooling Coil 63 at the pre-determined flow rate (e.g. 5 cfm) controlled by the Orifice 57. This first cycle is consider to be over when the temperature at Heater Thermo-couple 36 decreases by the pre-determined value (e.g. 20° C.) and automatically start the second cycle, unless the automatic repeat cycle has been set to single cycle or any self diagnostic program provided within the Computer Board 82 detects any abnormality.

After completion of the pre-set automatic Repeat distillation cycles, the receiving Tank 132, the Solenoid Valve SV8 100 is opened and the Transfer Pump PM2 126 transfers all fluid from the Receiving Tank 132 to the Duty tank 140. The Fan Blades 33 stays on until the temperature at the Heater Thermo-couple 36 goes down to the pre-determined value (e.g. 60° C.).

The Solenoid Valve SV9 102 is provided for the automatic switching of the 3-way valve in order to separate two distilled products as will be explained below. Refer to FIG. 3 illustrated below. This feature is not utilized in the application with the Recycling Object cleaning apparatus 170 shown in FIG. 1.

Shown in FIG. 3 is an embodiment of an auto-repeating Cycle Fluid distillation apparatus used for a two product output. In this example, the auto-repeating cycle fluid distillation apparatus unit 1 is adapted to produce two separate distilled products with different boiling point from one original liquid. In this version of the Auto-repeating Fluid distillation apparatus 1, two set up point temperatures can be programmed during the set up mode so that the distilled product may be segregated to two separate product with different boiling point as explained below.

In this example, the contaminated anti-freeze solution (typically comprised of water and ethylene glycol) which is commonly used in automobiles is distilled and separated into water, ethylene glycol and its contaminants or debris. The two set point temperatures are 110° C. and 200° C. of for this application as the boiling point of water is 100° C. and that of the Ethylene Glycol is about 180° C. The set point temperature should be set slightly higher than the known boiling point of the new liquid, as the actual boiling point may be higher depending on the extent and the type of contamination and the physical nature of the contaminant.

Most of the functions of the auto-repeating fluid distillation apparatus 1 in this application are the same as for the auto-repeating fluid distillation apparatus 1 installed in the recycling object cleaning apparatus 170 illustrated in FIG. 1 except that two set point temperatures are set up in the Computer Board (82) and that the Vacuum Pump VP 79 is not activated since both set points are lower than 200° C. Within each distillation cycle, the temperature at the Heater Thermo-couple 69 is kept at the first set up point of 110° C. until the pre-determined period of time (e.g. 10 minutes) after the evaporation at the first set point has been completed. During this time, the water only is distilled and the 3-way Switch Valve 126 is positioned to send the water to the Container No.1 132. (Note: If the Level Sensor LS3 129 detects full level before the evaporation of water has been completed, the Heater (2) is terminated and an error message is shown in the LCD Display 81 urging operator to replace or empty the Container No. 1 132 and press Start/Stop button on the Control Panel 80 to resume the operation.

The set point is then automatically changed to the second set point of 200° C. and at the same time, the Solenoid Valve SL9 102 is opened and the Air Cylinder 127 shifts the 3-way Switch Valve 126 to the position to direct the product flow to the Container No.2 133. As the temperature inside the Distillation chamber 62 rises above 180° C., the Ethylene Glycol starts flowing out from the Outlet Tube 135 into the Container No. 2 133.

Before the start of the next auto-repeat cycle, the Solenoid valve SV9 102 is closed and the 3-way valve 125 is returned to the original position.

The auto-repeating cycles may continue until the set number of cycles have been completed or the auto-repeating cycles are earlier terminated due to error condition. If the Storage Tank 140 becomes empty before the completion of the set number of cycles, the self diagnostic program will detect it and stop the operation with "Empty Tank" error message, even though it is not really an error condition.

All Solenoid Valves shown in the above examples are intrinsically safe type and are the normally closed type and open only when the electric power is supplied from the Power Control Board 48. In the actual design, however, some may be the normally closed type and some others may be the normally open type.

Preferably, all pumps 114, 126 and 115, the Vacuum Pump 79, and the Air Cylinder 9 are pneumatically operated.

As soon as any one of the Level Sensor LS2 49 for the Debris Container 27 or the Level Sensor LS3 129 for the Receiving Tank 132 detects full level, the Computer will stop the operation and shows error message on the LCD 81 accordingly.

The Debris Container 27, the Receiving Tank 132 and the Duty tank 140 are provided with a breather hole 26. It is preferable to drain debris while it is hot and in liquid form since when cold the debris typically is a thick material like grease.

The use of the Differential Pressure Sensor as the Level Sensor LV1 8 is unique. Because of the fact the pressure inside the Distillation chamber 62 will vary due to fluctuation of evaporation speed and function of the vacuum pump 79, the Level Sensor LS1 8 is the differential pressure type having two sensor ports of which both are connected to inside of the Distillation chamber 62. When the fluid level reaches one tube and a small pressure is created, the pressure difference between two tubes is interpreted as "full level".

The pre-determined temperature used for indication of evaporation may not be a fixed value such as 55.C. The following parameter table (or formula set out below) is used to set the temperature to indicate active evaporation.

| Set Point Temperature (=S) | Evaporation Indicator Temperature (=T) |
|---|---|
| 50° C. to 100° C. | 50° C. |
| 101° C. to 150° C. | 60° C. |
| 151° C. to 200° C. | 70° C. |
| 201° C. to 250° C. | 80° C. |

Formula:

$$T=0.25S+20$$

It should be appreciated that: (a) the Agitation Cycle may be selectively turned off, if the fluid to be distilled is highly evaporative, (b) the Vacuum Distillation feature may be turned off, if the fluid to be distilled has relatively low boiling point and the vacuum distillation is not required.

The minimum number of the auto-repeating cycle is one (1) and the maximum number may be pre-set only at the factory. This adjustment is not available to the operator.

The maximum set point temperature is preferably pre-set only at the factory and thus this adjustment is not available to the operator.

If certain error conditions makes it necessary to manually drain the fluid remaining in the distillation chamber 62, the solenoid valve SV3 54 may be activated by pressing certain two of the buttons on the Control Panel 80 simultaneously for the pre-determined period of time (e.g. 5 seconds) only while such error condition exists.

In order to activate more than one solenoid valves simultaneously, the Power Control Board 48 inside the Explosion Proof Tube 31 is designed to have multiple intrinsically safe outputs. The Sealing Fittings 340, the Sealing Connectors 30 and other connectors, fittings, etc used in the Auto-repeating recycler 1 are all certified type for use in hazardous location as required.

In the embodiment of the recycler described above, the vacuum pump 79 is turned on during the distillation process regardless of the set point temperature used. Most of the common fluids to be distilled have the boiling point lower than 200° C. which is the maximum set point temperature we want to use for this equipment. It is possible that the vacuum pump could be turned on only when the set point the operator set up is over the pre-determined value (e.g. 150° C.). This will prevent the unnecessary use of the vacuum pump and will greatly prolong the life of the vacuum pump.

In the embodiment described above, the set point may be manually set up in the Computer Board 81 by the operator before starting the distillation process. The operator does not always know the boiling point of the contaminated liquid to be distilled. Furthermore, the boiling point also changes depending on the type and extent of the contamination. Some contaminants such as oil, grease, etc. tend to increase the boiling point greatly. Therefore, it may be desirable to have automatic set-up of the maximum boiling point. This may be easily achieved by first finding the temperature of the condenser Thermo-couple (68) at which the evaporation started. Then set up the temperature which is higher than the temperature detected by the pre-determined value (e.g. 30° C.). This set-up point will remain until the auto-repeating cycles have been completed.

The set point for each distillation cycle may be altered as required. For example, when the set point is set at 200° C. before the start of the first auto-repeat cycles, the first two cycles may be programmed to provide 170° C. (SP-30° C.). This feature is particularly useful for distilling of substances.

Figures 4, 4A:
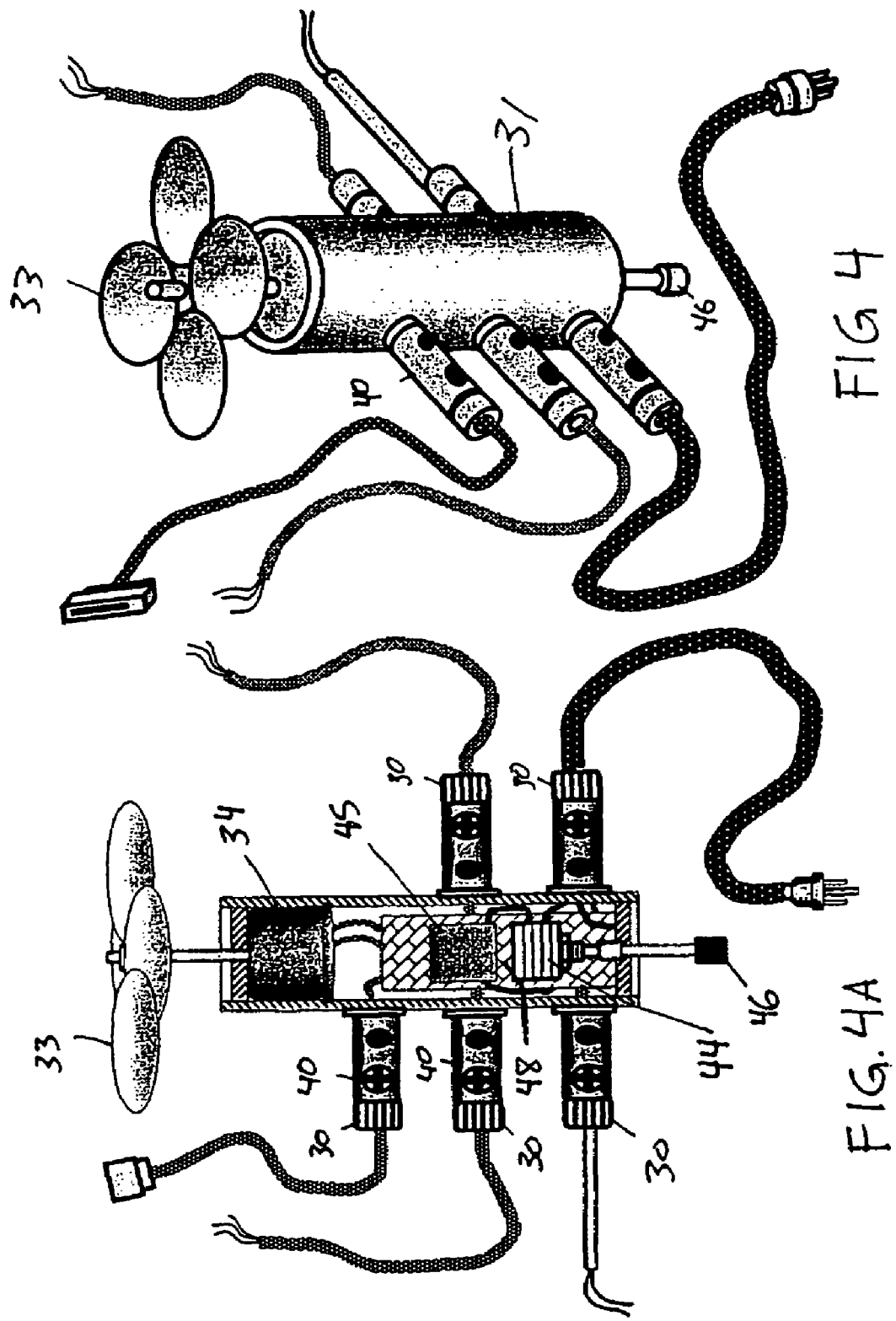
FIG. 4 is a perspective view of an embodiment of an explosion proof housing of the invention.
FIG. 4A is a perspective view of the internal components within the housing of FIG. 4.

An aspect of the invention is the provision of an Auto-repeating Fluid distillation apparatus such as those shown in the above examples which are designed to be intrinsically safe and explosion proof. To achieve this design objective, all non-intrinsically safe components such as the Fan Motor 34, the Power Control Board 48, the EMI Filter 45, the Emergency Power Switch 44, the related wiring, etc. are installed inside the Explosion Proof Housing 31. The explosion proof housing 31 is shown in FIG. 4 and its components shown in FIG. 4a.

The Computer Board 82 and all other electrical parts including the nine solenoid valves from SV1 (56) to SV9 100, the Thermo-couplers 70 and 36, the Level Sensors LS1 8 and LS2 49 and wirings installed outside of the explosion proof enclosure which consists of the Explosion Proof Housing 31, the Terminal Housing 28 and the Metal Conduits 29 and 32. The construction and the design of the Auto-repeating Fluid distillation apparatus 1 satisfy the requirements of CSA, UL, CE and JIS standards for the equipment to be used in normal location, the hazardous locations designated as Class 1, Division 2 and Class 1, Division 1. If the Auto-repeating Fluid distillation apparatus 1 is used in the area designated as the hazardous location, the Power Plug 60 must be of the explosion proof type as required for the designation.

Although not a specific requirement necessary to meet the above noted conditions, the Lid Holding Bar Assembly 10 which holds the Lid Assembly 9 onto the Distillation chamber 62 in the closed position is designed to function as the reliable and sensitive built-in pressure relied mechanism. In particular, the Lid Holding Bar Assembly 10 has a Pivot 65 on one end and the other end is provided with the Lid Clamp 13 of which the Latch Wire 15 is hooked to the Clamp Catch 16 in the closed position. The Lid Assembly 9 can be opened easily for maintenance and service by just unlocking the Lid Clamp 13. The Lid Holding Bar Assembly 10 is made of spring steel and hold the Lid Assembly 9 downward with enough pressure on the Lid Gasket 7 to ensure the leak tight sealing.

Alternative design of the lid holding apparatus with pressure relief feature is shown in the illustration contained in the text below relating to the Interlocking Safety Lid for Recycler. The Outer Safety Cover 66 is hinged and closed over the Lid Assembly 9 so that the operator is prevented from accidentally touching hot surface of the Lid Assembly 9 or from being sprayed with hot fluid if some chemical being distilled accidentally explodes during the operation.

When the Outer Cover 66 is closed, the Hook 64 is engaged with the Positive Lock Apparatus (64) in which the automatic release mechanism may be actuated by an intrinsically safe magnetic solenoid. The details are not shown in FIGS. 1 to 3, however please refer to the below information and illustrations for the design alternatives. In order to prevent accidental opening of the Outer Cover until the Positive Lock Apparatus 64 automatically releases the positive lock when the temperature at the Tank Thermo-couple 36 confirms the pre-determined safe value (e.g. 60.C).

This feature is less useful when the Auto-repeating Fluid distillation apparatus (1) is installed inside the Base Cabinet 162 as is shown in FIG. 1. However, it becomes much more important in case the Auto-repeating Fluid distillation apparatus (1) is used independently as seen in FIGS. 2 and 3.

As shown in FIGS. 1 to 3, the auto-repeating Fluid distillation apparatus 1 is preferably equipped with a remote transmitter 75. The remote transmission media may be infra-red, radio wave or laser. The remote transmitter can communicate with the remote alarm apparatus 190 and/or remote fire extinguisher 180. Various error conditions detected by the self diagnostic programs and/or the self-test mode which are built into the computer board 82 are transmitted to remote signal receiver 183 or 193 of these remote devices to activate the required function as described below.

The Remote Alarm Apparatus 190 and the remote fire extinguisher 180 require much more electric energy to function than could typically be intrinsically safe and therefore they must be safely installed outside of immediately surrounding hazardous area of the recycler. By providing the separate remote devices as herein proposed, the auto-repeating fluid distillation apparatus 1 which is constructed and duly certified as the explosion proof equipment for use in even for Class 1, Division 1, hazardous location can offer much improved safety to the operator and the environment.

Remote Alarm Apparatus 190 consists of the visual alarm signal 192 like a flashing red light, the audible alarm signal 191 like a speaker or a buzzer, Remote Signal Receiver 193, the Power Cord 194 and the Power Plug 195 is connected to electric power supply.

Depending on the type and the seriousness of the error condition signals transmitted from the Remote Transmitter 75 of the Auto-repeating Fluid distillation apparatus 1, variety of different visual alarm signals and audible alarm sounds may be generated by the Remote Alarm Apparatus 190 so that any corrective action can be taken as quickly and safely as possible. The apparatus could be equipped with a modem which may be connected to a telephone line or communicated via cellular communication such that presence of error conditions may be transmitted to preprogrammed telephone numbers of individuals in charge of monitoring the condition of the Auto-repeating Fluid distillation apparatus 1, thereby allowing monitoring of the fluid recycling from remote locations.

Remote Fire Extinguisher consists of the Fire Extinguisher Tank 181 such as a CO2 canister, the Spray Head 182, the Release Valve Controller 184, Remote Signal Receiver 183, the Power Cord 185 and the Power Plug 186 connected to electric power supply. The fire extinguisher is activated upon receiving the signal from the Remote Transmitter 75 of the Auto-repeating Fluid distillation apparatus 1.

As part of the invention an electronic control apparatus is provided which automatically (and also manually) controls distillation process and related functions, being programmable to perform one or more automatically repeated distillation cycles, said electronic control apparatus comprising at least one microprocessor with memory, a means for monitoring temperature at one or more predetermined locations, a means for receiving signals from analog and digital devices, and sending electronic digital or analog signals to electric and electronic devices.

An electric power control apparatus also provides electric power to the fluid distillation apparatus. A means for connecting to an electrical power source is provided, comprising an electric power cord to receive the electric power supply. The electronic control apparatus further comprises a means for calibrating temperature displayed on said LCD by pressing key switches in predetermined sequences. The electronic control apparatus may further comprise a self diagnostic program monitor error conditions and, upon detecting error condition, to perform pre-programmed corrective action and to display error messages. The self-diagnostic program generates audible alarm sound upon detecting error conditions (i.e. abnormal fluid level, temperature and pressure).

The electronic control apparatus may comprise a test mode which is accessible by operator to start automatic test sequences and, upon detecting error condition, to display error messages. Error messages may be displayed in LCD or expressed by means of blinking LED Lights in some model.

A data bank apparatus for storing operation history data including a cumulative hours of operation, set point used and technical problems may be provided. The electronic control apparatus may be programmed to enable switching temperature displayed on LCD between Celsius and Fahrenheit by pressing key switches in predetermined sequences.

The electronic control apparatus may be programmed: to enable selection between volume measurement units or number of repeated cycles by pressing key switches in predetermined sequences; to enable selection of languages displayed on LCD by pressing key switches in predetermined sequences; to automatically transfer condensate from means for containing condensate to another container; to retain status of distillation operation in memory so that, after interruption during operation, operation may be re-started from where it was interrupted; to enable opening and closing of said drain valve by pressing key switches in predetermined sequence; to enable turning on and off of said distillation chamber filling apparatus by pressing key switches in predetermined sequence; to enable manual control of each of all said solenoid valves by pressing key switches in predetermined sequences; and to enable set-up of more than one set of distillation condition(s) including at least one of boiling temperature, heater power strength, application of vacuum, etc. so that a mixture of two or more fluids with different distillation conditions can be separated through distillation process.

The electronic control apparatus further comprises a clock for turning on and off distillation operation according to daily, weekly and monthly schedule pre-set by operator. The electronic control apparatus may further comprise a built-in memory so that, when distillation operation is interrupted before completion, it could be started from where said operation was interrupted.

The electric power control apparatus may further comprise some or all of transformer, fuse, TRIAC (power control transistor), circuit board, opt-coupler, capacitor, register, and connector. The electronic control apparatus may be programmed to automatically cause agitation, for a pre-determined period of time, the fluid in container which contains fluid to be distilled and then to start said distillation chamber filling apparatus. Air may be blown into the contaminated fluid for 5 seconds before transfer to minimize chance of clogging flow line with dirt. The electronic control apparatus may be programmed to stop said filling cycle when predetermined period of time elapses, or said means for monitoring detects the predetermined volume, whichever occurs first.

Agitation may be achieved in the invention by introducing flow of compressed air for a pre-determined period of time into said container which contains fluid to be distilled. Preferably the distillation chamber filling apparatus further comprises a means for automatically stopping filling cycle by the function of said electronic control apparatus when fluid in said distillation chamber reaches predetermined volume.

A means for monitoring fluid level may be a combination of a float and magnetic switch, a pressure sensor, a proximity sensor, or a light sensor may be provided.

A container to receive debris may be a drawer type container easily removable for debris disposal and service. Such a drawer type debris container provided may be easily removed from the unit by opening a debris compartment door. The container to receive debris may be provided with a means for monitoring level of debris so that distillation or draining may be terminated when level is full. The means for monitoring level of debris in said debris container may be a combination of light emitter and light sensor or proximity sensor so that debris level is detected without physical contact.

A means for causing higher pressure in said distillation chamber to improve draining of debris may be provided. A debris draining apparatus in the distillation chamber further comprises air cylinder or air rotary actuator-as a means for actuating a said valve. (2 air cylinders may be used.) The valve in said debris draining apparatus may be a spring loaded normally closed one way check valve which opens under pressure to allow said debris to drain. The debris draining apparatus may further comprise a storage compartment for accommodating said debris container within the unit. The retaining cabinet of the fluid distillation apparatus may comprises a door to said debris storage compartment and said means for containing debris can be removed or installed easily by opening said door.

Condensate is automatically supplied to a (receiving) container located outside the recycler through a fluid outlet port. This may be achieved by gravity, vacuum or a pump. A means for connecting fluid flow line to a container containing fluid to be distilled and also to a container into which distilled fluid is to be received. (Those containers may be located onside or outside of the unit.) A means for communicating signal to a means located outside for transferring distilled fluid from one container to another container may be provided for example a transfer pump located outside will be activated by air pressure supplied by the unit.

A means for monitoring fluid level in said another container may be provided in order to halt the transfer upon detecting full level in said another container. (Wording needs to be refined.)

Provided may be at least one air inlet port for receiving compressed air supply and at least one air outlet port to supply air pressure to an external apparatus. Provided may be at least one water inlet port for receiving water supply and at least one water outlet port. A separate suction pipe which is to be connected to fluid inlet port for transferring fluid into said distillation chamber may be provided. The separate suction pipe may be provided with an air line through which air pressure is supplied to agitate fluid according to predetermined control sequence.

The distillation chamber may be made of stainless steel or other material covered by rust protective surface. The lid of said distillation chamber is made of stainless steel or other material covered by rust protective surface. In fact, all components exposed to flow of fluid and vapor of fluid may be made of stainless steel or other material covered by rust protective surface or non-rusting material. Plastic parts may also be used to resist rusting from acidic fluid. The means for sealing between said distillation chamber and its lid consists of at least one of the materials selected from the group consisting of Teflon, Viton, Silicon, Boron, Neoprene, EPDM, or Ethylene.

A means for relieving pressure in the distillation chamber may comprise at least one spring loaded valve constructed to start opening when pressure in said distillation chamber or passage connected openly to said distillation chamber becomes higher than a predetermined value. The spring loaded valve in said lid of said distillation chamber may held in closed position by means of spring bar. The electronic control apparatus further comprises a progress monitor program for monitoring process conditions and displaying progress status and/or conditions on LCD panel, namely the temperature at distillation chamber bottom, vapor outlet, set point temperature, stage of operation, etc. are displayed alternatively or independently on LCD panel.

A progress monitor program may be provided which displays multiple of process conditions on LCD alternating in predetermined period of time. For example, set-up temperature, actual temperature of distillation chamber, actual temperature of vapor tube are displayed alternatively for every 5 seconds on the display.

Figure 5:
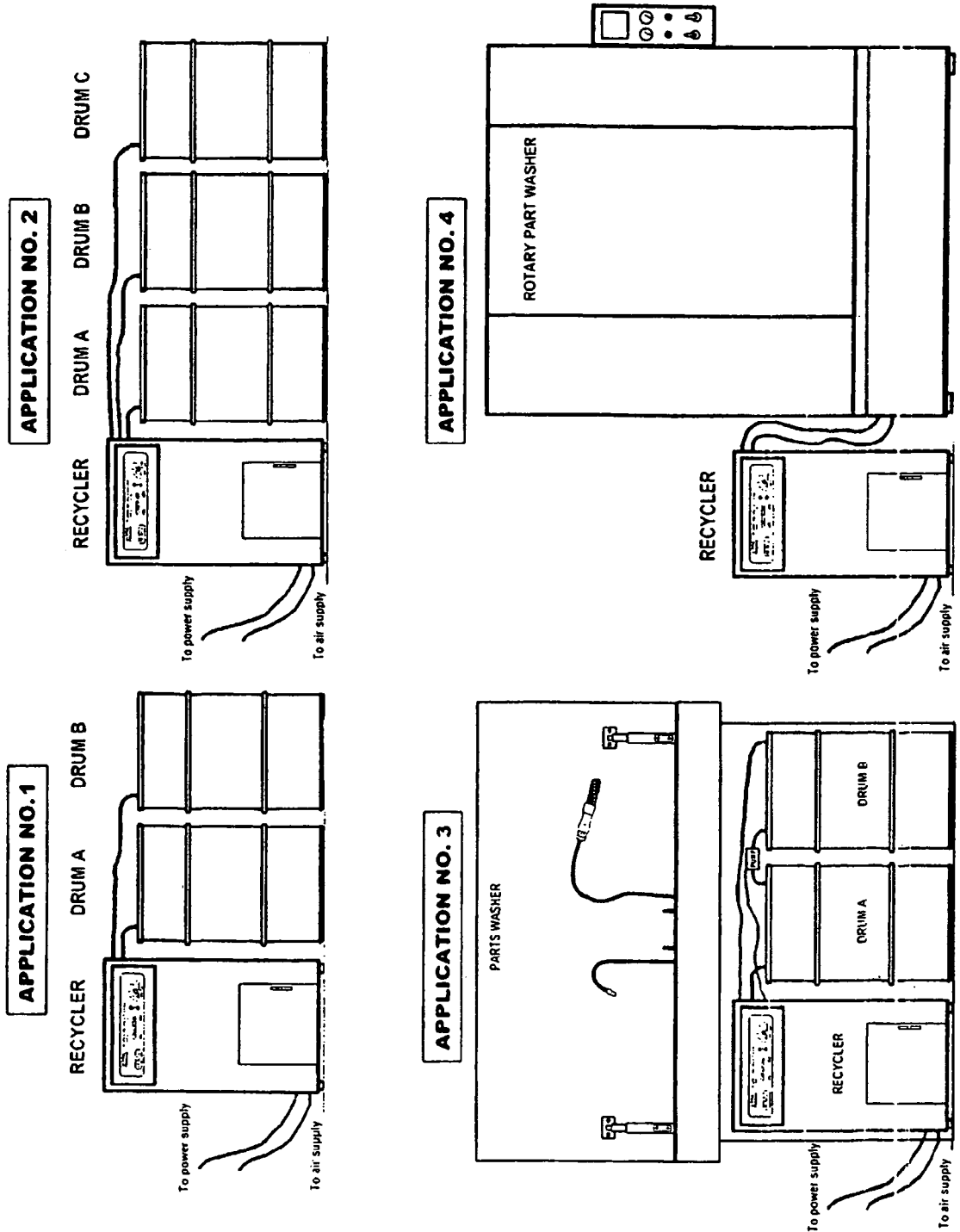
FIG. 5 is a schematic representation illustrating four separate applications of an auto repeating fluid distillation apparatus according to the invention.

Shown in FIG. 5 are examples of four applications of the Auto-repeat fluid distillation apparatus. Application No. 1 shows the use of the recycler to distill contaminated fluid in drum A and send it to Drum B for storage. Application No. 2 shows the recycler used to distill a contaminated mixture of two liquids in Drum A, separated the liquids into Drum B and Drum C. Application No. 3 shows contaminated fluid gathered in drum B, which is distilled and pumped to Drum A. Application No. 4 shows the use of the recycler with a large Automatic Rotary Object cleaning apparatus, which continuously removes the contaminated fluid and returns distilled fluid to the washer.

Such Inter Locking Safety Device may be adapted on Safety Cover 1 or Locking Clamp 5 of Tank Lid 2 or both. In electric apparatus, Magnetic Solenoid 6a which works with electric current of less than $\frac{1}{16}^{th}$ Ampere is used to ensure intrinsic safety. Safety Lid (Outer Lid) 1 is automatically locked during the distillation process and unlocked when it becomes safe to open it. Three methods of actuating the automatic locking apparatus are proposed here.

A further aspect of this invention relates to the Lid of the distillation chamber of fluid recycling equipment, which may be used with the auto repeat fluid distillation apparatus of the invention. If the operator of a recycler accidentally opens the lid of distillation chamber during the distillation operation, it is often dangerous due to the high heat and the exposure to volatile fluid or it's vapor. This aspect of the invention is intended to provide measures to prevent the accidental opening of the lid during the operation. By way of example only, the following is a description of an embodiment of an aspect of the invention, namely relating to the Lid of the Distillation chamber shown in FIGS. 6A to 6E.

Figure 6A:
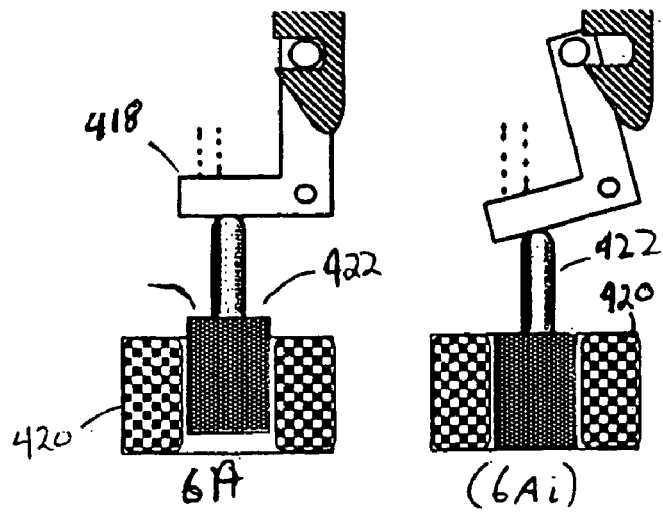
FIGS. 6A to 6C are illustrations of embodiments of locking mechanisms for a safety cover for use with a fluid distillation apparatus in accordance with the invention.
Figure 6C:
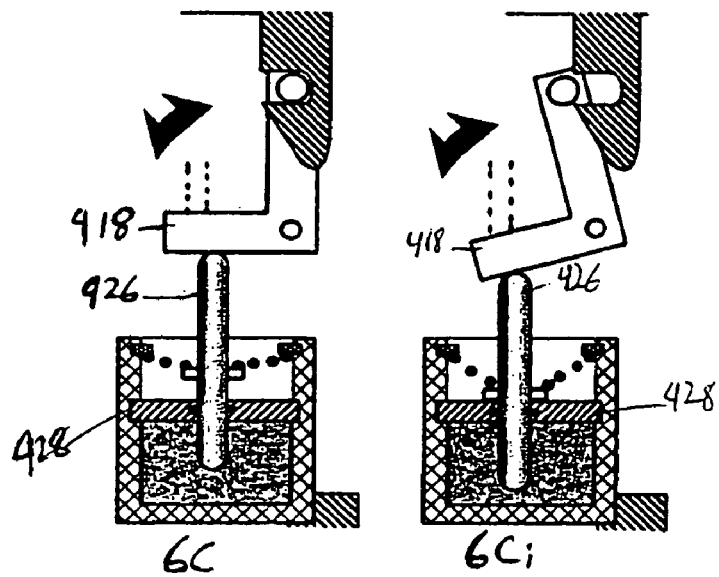
Figure 6B:
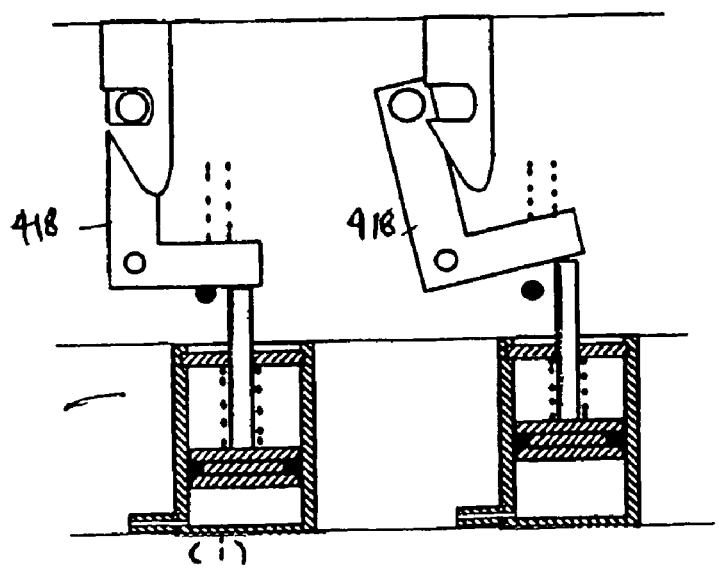
Figure 6D:
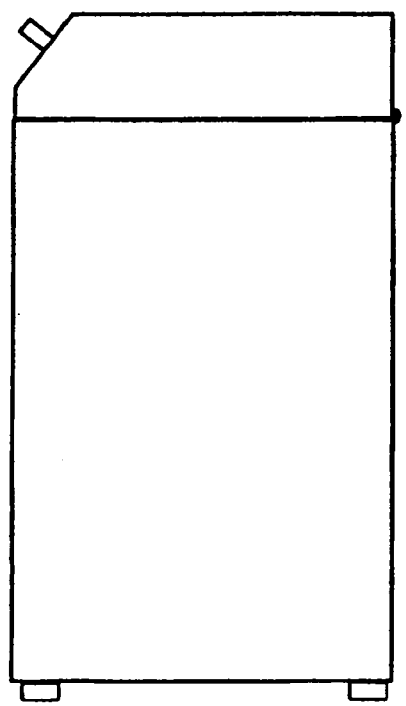
FIGS. 6D to 6E are illustrations of embodiments in accordance with the invention of a Safety Lid for Use with Fluid distillation apparatus and components thereof.
Figure 6E:
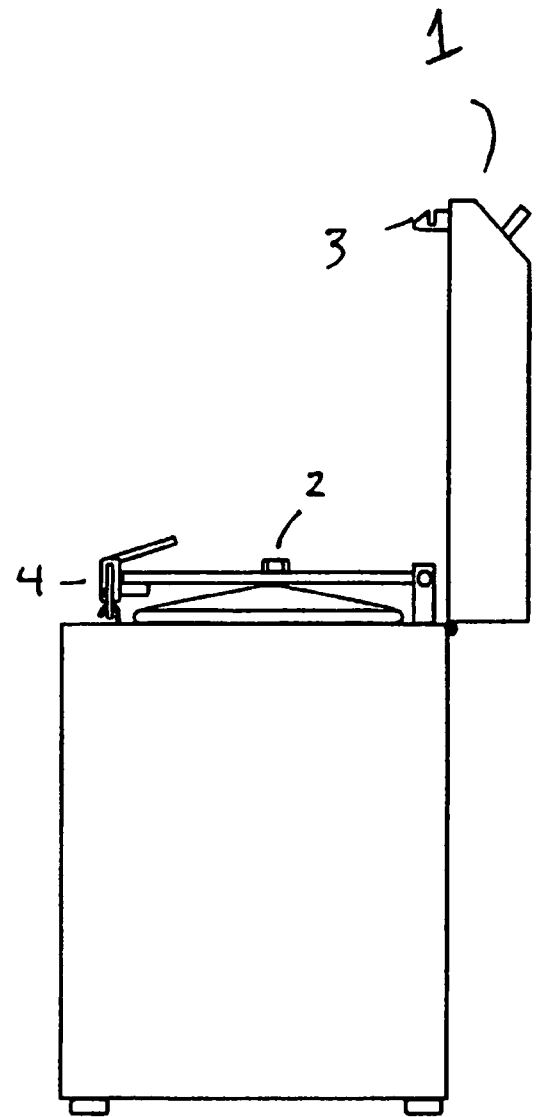

Shown in FIGS. 6D and 6E is a hinged Outer Safety Cover 1 over Distillation chamber Lid 2. A Hook 3 is provided at the front end of Outer Safety Cover 1 which engages with Catch 4 when the Safety Cover 1 is closed and locks Safety Cover 1 in the closed position, thus preventing Safety Cover from being open during the distillation operation. After completion of distillation operation and the temperature drops to safe level, the Catch 4 automatically releases the Hook 3 and Safety Cover 1 is unlocked.

As shown in the detailed illustrations 6A to 6C, the Catch 4 may be actuated to be release in different manners. Shown in FIGS. 6A and 6Ai the catch is actuated to be released by magnetic actuation. Shown in FIG. 6Ai, the locking arm 418 is biased in an unlocked position. When the temperature reaches a specified elevated "unsafe" value, the coil 420 is energized and an armature with permanent magnet 422 pushes the locking arm 424 into the locking position (shown in FIG. 6A), thereby preventing the opening of the lid. When the temperature goes down to a predetermined safe level, electric power is disconnected from the coil 420 and a biasing means pushes the locking arm back to the unlocked position.

As shown in FIGS. 6B and 6Bi the catch is actuated pneumatically. When the temperature reaches the elevated unsafe value and electrical signal is sent to a solenoid valve which actuates the locking mechanism into the locking position.

As shown in FIGS. 6C and 6Ci a wax pellet 426 is used to actuate the locking mechanism. When the temperature reaches the specified elevated unsafe value, the wax pellet is fixed within a housing 428 and expands to actuate the locking arm into the locked position (shown in FIG. 6C). When the temperature goes down to the safe level, the wax pellet shrinks (Shown in FIG. 6Ci) thereby allowing the return of the locking arm to the unlocked position.

Figure 7E:
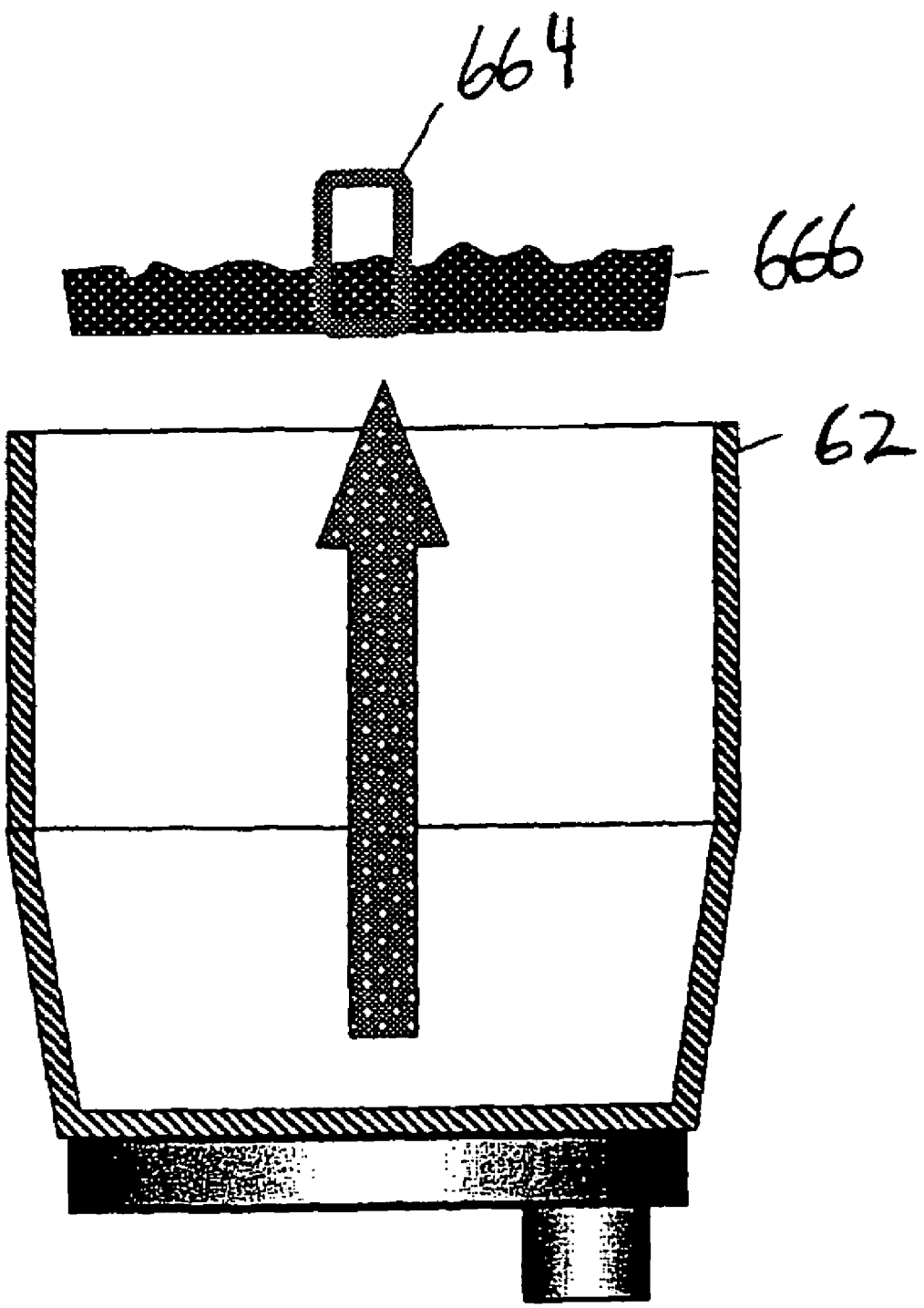
FIG. 7E is a section view of the embodiment of the distillation chamber of FIG. 7A with debris removed.

An embodiment of a further aspect of the invention is illustrated by way of example in FIGS. 107A to 7E. This aspect of the invention relates to an innovative design of a distillation chamber which may be used with an auto repeat fluid distillation apparatus of this invention as distillation chamber such as tank 62 shown in FIGS. 1 to 3. The design of a distillation chamber 62 shown in FIGS. 7A to 7E enables easy removal of the solid debris without using a liner bag. Under the circumstances, this aspect of the invention provides an innovative design of the distillation chamber, which will enable easy removal of the solid debris without using liner bag. This aspect of the invention proposing a design of a distillation chamber, is illustrated by way of example in FIGS. 7A to 7E, having a tapered bottom section. To assist easy removal of the solid debris, the entire inside surface of the distillation chamber shown in FIGS. 7A to 7E or at least the tapered section 662 is finished with a coating which minimizes adhesion. Such finish may include but is not limited to Teflon coating, anodized aluminum, or porcelain over steel, etc. A disposable handle 664 which is designed to be standing at rest on the bottom of the tank is placed at the bottom of the distillation chamber before start of distillation chamber as shown in FIGS. 7C to 7E. A heater unit 680 is positioned below the bottom of the tank to activate the distillation.

After completion of the distillation of contaminated fluid 660, as shown in FIGS. 7C to 7E, the solid debris 666 will have adhered to the handle and the handle may be easily removed by lifting the disposal handle as shown in FIG. 7E. The disposal handle may be made of steel or other inexpensive material and is disposed together with the solid debris. The low friction surface finish and the tapered bottom design allow the solid debris to detach easily from the distillation chamber In accordance with a further aspect of the invention a further improved distillation chamber 62' is provided, shown by example in FIG. 8. Commonly, distillation chambers used in fluid distillation apparatus are comprised of stainless steel in order to enhance the tank's chemical resistance. Typically the tank is a double shelled assembly with an inner stainless steel tank and outer tank. Typically, the cavity between the double shell tanks is filled with thermal oil which requires periodic replacement due to the thermal oil gradually loosing its heat conductivity and thereby lead to explosion. Replacement of the thermal oil tends to be cumbersome and the disposition of the used thermal oil is difficult and expensive. Typically the inner tank and the outer tank are not completely sealed to enable oil replacement and also to allow for the heat expansion of the oil. This also poses problem of the oil leakage possibility during transportation.

Figure 8:
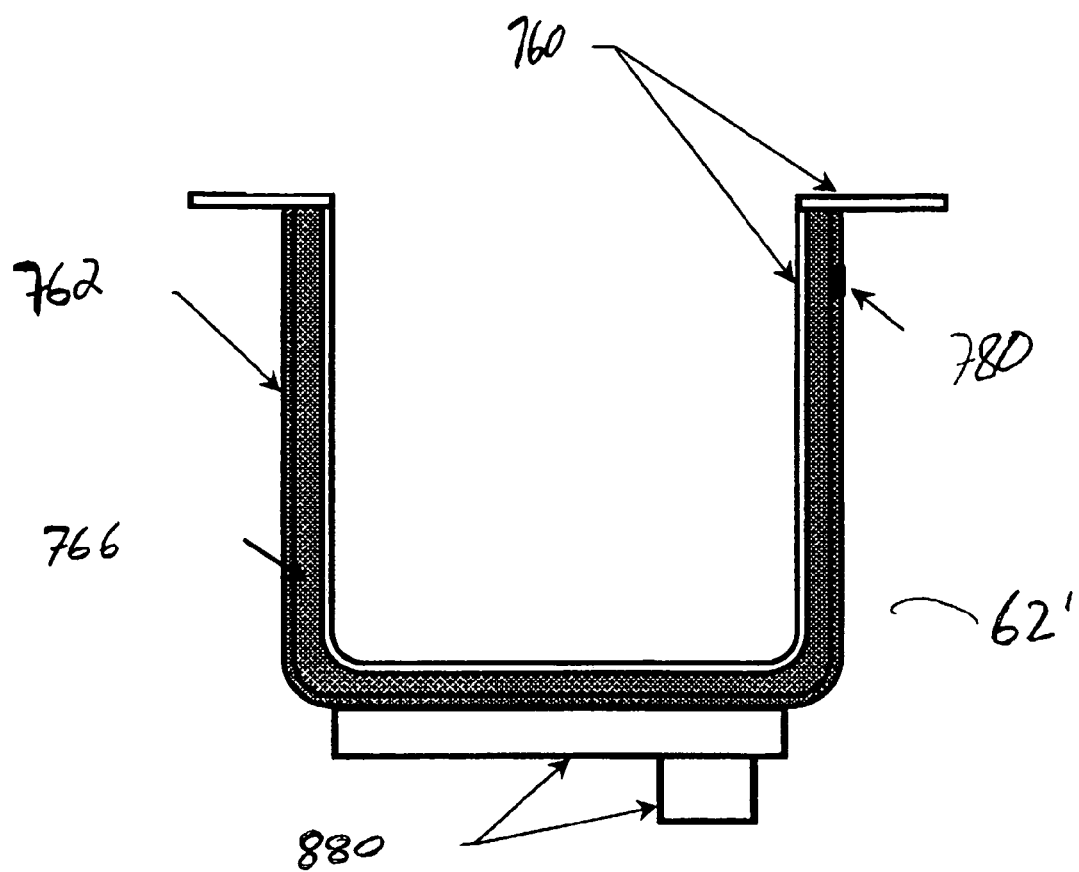
FIG. 8 is an illustration of an embodiment of a double shell distillation chamber assembly in accordance with the invention.

As shown in FIG. 8 by way of example, in accordance with an aspect of the invention provided is a unique construction of the distillation chamber assembly of which the inner tank 760 is comprised of stainless steel, yet eliminates all the disadvantages of the typical design which utilize thermal oil as explained above. In accordance with an aspect of the invention, as shown in FIG. 8, the inner tank is made of stainless steel and the outer tank 762 is made of mild steel or stainless steel. Both tanks are welded together. The cavity between two tanks is filled with a special heat conductive material 766 which is not any kind of oil and then the small filler port 780 is completely sealed by welding. The Heater Assembly which is made of steel is welded to the bottom of the Outer Tank. Even though stainless steel has very poor heat conductivity, the inside surface of the stainless steel tank is evenly heated due to the heat conductive material inserted between the tanks. A heater unit 880 is positioned below the tank to actuate the distillation.

An object cleaning apparatus (or object cleaning apparatus) such as the one shown in FIG. 1 forms a further aspect of the invention. Preferably the object cleaning apparatus is modular in construction and includes a built-in fluid distillation apparatus. Ideally, the fluid distillation apparatus is an easily removable modular unit. A cleaning sink having at least one opening at bottom, a base cabinet having at least one opening, a duty cycle fluid container for holding fluid used for cleaning object(s), a clean fluid container for holding distilled fluid, a means for cleaning object(s) comprising at least a brush, a spigot, a means for applying fluid onto object(s) or fluid flow line may be provided. A means for controlling fluid flow to said means for cleaning object(s), a means for transferring distilled fluid to duty cycle fluid container, such as for example a pump means, and means for turning on and off said pump means may be provided. A venturi may be used for this purpose. A means for transferring fluid from duty cycle fluid container to said means for cleaning object(s), a fluid flow line between said duty cycle container and fluid inlet port of said fluid distillation apparatus and a fluid flow line between said clean fluid container and fluid outlet port of said fluid distillation apparatus.

The object cleaning apparatus may include the following features: It may use a sink made of stainless steel or other material covered by rust protective surface. Its cabinet may be made of stainless steel or other material covered by rust protective surface. The duty cycle fluid container is made of stainless steel or other material covered by rust protective surface. The duty cycle fluid container or said clean fluid container, or both further comprises a cone shaped bottom deeper towards center.

The clean fluid container may further comprise a cone shaped bottom deeper towards center. The duty cycle fluid container or said clean fluid container, or both are made of stainless steel or other material covered by rust protective surface. A lid may be provided to cover the cleaning sink. The lid is made of stainless steel or other material covered by rust protective surface. The lid may be installed to the said sink by way of hinge means. At least one lid stay with a fusible link is provided for enabling said lid to be supported in open position. Preferably, one or two spring loaded Lid Stays are used so that the lid will automatically close when heat from fire melts the fusible link of the Lid Stay. The clean fluid container is constructed to withstand vacuum applied during distillation under vacuum. A total of three pump means may be employed, one for filling the clean fluid container, one for transferring distilled fluid from said clean fluid container to said duty cycle fluid container and one for transferring fluid from duty cycle fluid container to said means of cleaning object(s). The duty cycle fluid container, or said clean fluid container, or both is provided with a means for monitoring fluid level therein.

The fluid distillation apparatus (or fluid distillation apparatus) used with the object cleaning apparatus (object cleaning apparatus) may be installed inside said base cabinet so as to enable easy removal and re-installation. Quick coupler and connectors may be used for all fluid lines and airlines connection between recycler and object cleaning apparatus.

The fluid distillation apparatus is installed so that removal of said fluid distillation apparatus from said object-cleaning apparatus does not disable object-cleaning function. The duty cycle fluid container may be installed directly under said opening at bottom of sink. A door or doors of the said base cabinet may be removed and reinstalled easily. The duty cycle fluid container and said clean fluid container are constructed to be one container with a divider separating two compartments. The duty cycle fluid container is placed directly above said clean fluid container so that the bottom of said duty cycle fluid container functions as a lid for said clean fluid container. The set of duty cycle fluid container and clean fluid container may be installed inside said base cabinet so as to enable easy removal and re-installation.

With respect to the object cleaning instruments the brush is constructed to allow flow of fluid through its handle and bristles. Means for controlling fluid flow comprises at least one valve with handle for controlling fluid flow to spigot and/or brush. For example, ball valves within the handle control flow to the brush and to spigot independently. The duty cycle fluid container may be provided with a visible means of indicating fluid level in duty cycle fluid container. The fluid container may be provided with a visible means of indicating fluid level in clean fluid container. Means for transferring fluid from duty cycle container to said means for cleaning object(s) may comprise pneumatically or electrically driven pump(s). A timer may be provided to shut off the supply of fluid to the spigot and/or brush after pre-determined period of time. For example, current model has max. 15 minutes timer. A foot pedal may be provided to turn on and off the supply of fluid to the spigot and/or brush as desired. The opening at the bottom of sink has fluid flow communication with said duty cycle fluid container. A strainer or a screen filter or both are provided in said opening at bottom of sink. The strainer or screen filter or both are easily removable for service and maintenance. A fluid heating apparatus may be provided for heating fluid in controlled manor to improve cleaning results. The fluid heating apparatus may comprise at least one digital control device and at least a means for monitoring temperature. A fume extraction apparatus for extracting fume of fluid may be provided and preferably the fume extraction apparatus further comprises a fan driven by electric motor, pneumatic venturi, or combination of both.

Preferably the flow of fluid for cleaning object(s) is automatically turned on and off by the function of motion sensors, heat sensors, proximity sensors or pressure sensors or a combination thereof.

The object cleaning apparatus may have a sink which further comprises an automatic object cleaning apparatus controlled by at least one microprocessor for controlling automatic cleaning functions. The automatic object cleaning apparatus further comprises a means of transporting objects within said sink automatically in predetermined movement. The automatic object cleaning apparatus may further comprise a means for dividing the sink to more than one section, each section having at least one passage through which to receive a flow of fluid and at least one passage through which to let out a flow of fluid. The automatic object cleaning apparatus further comprises an ultrasonic cleaning apparatus. The automatic object cleaning apparatus may further comprise a means for heating fluid to improve cleaning. The automatic object cleaning apparatus may further comprise a means for drying objects which have been cleaned. The automatic object cleaning apparatus includes the following functions cleaning, rinsing, moving, and drying of objects not necessarily in the herein described sequences.

A further embodiment of an automatic object cleaning apparatus (also referred to a object cleaning apparatus) with a built-in fluid distillation apparatus comprises (in modular construction), a fluid distillation apparatus as described above attached as an easily removable modular unit; a cleaning chamber for holding objects to be cleaned, having at least one opening through which said objects are moved into and out of said cleaning chamber, a means for closing (and opening) said opening comprising at least one door, a means for moving said objects within said cleaning chamber in horizontal, vertical, rotational direction in predetermined manner (and for predetermined length of time), a means for automatically cleaning objects inside said cleaning chamber by forcing movement of either one or both of said objects or fluid which is heated or not heated, (this covers spraying, soaking, agitating, tumbling, vibrating or combination thereof, through pump, ultrasonic, shaking, etc.); a duty cycle fluid container for containing fluid used for cleaning object(s); a means for transferring said fluid from said duty cycle fluid container to said means for automatically cleaning objects, a clean fluid container for holding distilled fluid; a means for transferring distilled fluid from said clean fluid container to said duty cycle fluid container, a fluid flow line between said duty cycle container and fluid inlet port of said fluid distillation apparatus; a fluid flow line between said clean fluid container and fluid outlet port of said fluid distillation apparatus, a means for controlling automatic cleaning and related functions comprising at least one electric or electronic control device.

The object cleaning apparatus may include the following features: The chamber is made of stainless steel or other material covered by rust protective surface. The door of cleaning chamber is made of stainless steel or other material covered by rust protective surface.

The door is attached to said cleaning chamber by hinge means. The cleaning chamber further comprises a means for holding said door securely in closed or open position.

The cleaning chamber further comprises a means for locking said door securely in closed position. The duty cycle fluid container is made of stainless steel or other material covered by rust protective surface. The duty cycle fluid container comprises an integral part of said cleaning chamber.

The duty cycle fluid container or said clean fluid container, or both further comprises at least one opening at bottom for draining said fluid. The opening at bottom is provided with a means for opening and closing said opening. The duty cycle fluid container or said clean fluid container, or both further comprises a taper shaped bottom deeper towards said drain opening. The duty cycle fluid container or said clean fluid container, or both is made of stainless steel or other material covered by rust protective surface. The clean fluid container is constructed to withstand vacuum applied during distillation under vacuum. The duty cycle fluid container, or said clean fluid container, or both is provided with a means for monitoring fluid level therein. The means for automatically cleaning objects comprises a means for applying ultrasonic vibration to said fluid while holding said object under said fluid. The means for applying ultrasonic vibration further comprises a means for heating said fluid through controlled methods. The means for automatically cleaning objects comprises a means for moving said object in reciprocating motion partly or wholly under said fluid, the means for automatically cleaning objects further comprises a means for heating said fluid through a controlled methods. The means for automatically cleaning objects comprises a means for moving said object in horizontal or rotational motion while applying flow of said fluid through multiple spray means. The means for automatically cleaning objects further comprises a means for heating said fluid through controlled methods. The means for automatically cleaning objects comprises a means for moving a means for applying flow of said fluid through multiple spray means while maintaining said object(s) in fixed position. The means for automatically cleaning objects further comprises a means for heating said fluid through controlled methods. The means for automatically cleaning objects further comprises a means for drying said object after completion of automatic cleaning operation. The means for automatically cleaning objects further comprises a means for automatically loading into said cleaning chamber and/or automatically unloading said object(s) out of said cleaning chamber. The means for automatically cleaning objects further comprises more than one cycle of automatic cleaning and/or drying under different set of conditions including type of cleaning fluid, temperature used for cleaning or drying, length of time, and/or method of cleaning or drying.

As will be apparent to those skilled in the art in the light of the foregoing disclosure, many alterations and modifications are possible in the practice of this invention without departing from the spirit or scope thereof.

The fluid distillation apparatus of the invention includes the following features:

Operation of the apparatus is controlled by Microprocessor
LCD or LED display for showing messages
Electric and pneumatic power sources may be utilized to power the apparatus.
Automatic repeating cycles with pre-settable distillation cycle and/or volume.
Distillation volume can be pre-set to desired total volume by US Gallons, British Gallons or Litres or number of butches.
Debris accumulated in the tanks may be automatically drained under pressure.
Distillation may be undertaken under atmospheric pressure or in vacuum conditions.
Automatic filling of the distillation chamber with contaminated liquid, by means of vacuum or pump
Automatic transfer of distilled liquid form receiving Tank to external container.
Explosion proof (Class 1, Division 1 or 2) construction.
All electric circuits outside of the Explosion Proof Enclosures are intrinsically safe.
All pneumatically controlled functions actuated by electric solenoid valves of which electric solenoid portion is accommodated inside of the explosion proof enclosure and the pneumatic valve portion outside of the explosion proof enclosure.
Specially developed pneumatic valve is designed to control fluid flow. (Air actuated liquid on/off valve).
Air cylinder actuated drain ball valve is controlled by solenoid valve.
An explosion proof enclosure with cooling fins is provided to increase cooling capacity.
The explosion proof enclosure is made of heat conductive material, aluminum, etc.
The explosion proof enclosure houses non-explosion proof Fan Motor, Power Control Board, etc.
A condenser (air-cooled or water-cooled) overheat detection (75° C.).
When a safety cover is open detection is achieved.
If so pre-set, set point temperature automatically increases upon detecting decrease of vacuum during the distillation.
Air pressure monitoring apparatus turns off heater when air pressure falls below preset value, and shows error message "Low Pressure".
Selectable languages for display—English, Dutch, French, Spanish, etc.
An Adjustable Set point temperature is provided.
Adjustable Multiple Set point temperatures for output separation.
Self-diagnostic function with error message display is provided.
Auto Test function on demand with test result display is provided.
Temperature is selectable between ° F. and ° C.
Built-in software for temperature calibration is provided.
Fluid inlet pipe inside the distillation chamber is placed so that inlet flow of dirty fluid will wash out the deposit of debris at the bottom of Tank during filling cycle.
VOC Leak Detector (Optional) automatically stops operation upon detecting fluid vapor leakage.
Auto Fume Extraction when VOC detected and/or Vacuum Process (and/or Tank Lid is opened.)
Fast Pressure Relief to fume extraction apparatus.
Vacuum used for distillation cycle is supplied by electric or pneumatic vacuum generator or inline pump means.
Safety lock on Inner and/or outer lid of distillation chamber automatically locks the lid during the operation and allow the lid to be opened only when the condition is safe for the lid to be opened for maintenance or service.
Dual lid (Distillation chamber lid and Outer Safety cover) for added safety. Swivel casters with brake for mobility. Quick couplers for both fluid inlet and outlet for easy connection to the other equipment such as object cleaning apparatus, brake washer, printing press, dry cleaning equipment, metal cutting machine, etc. Maximum safety timer stops heater if no vapor produced in the pre-set time period.
Stop operation, shows error messages in display, and/or activate alarm apparatus with visible and/or audible warning, under the following conditions: temperature at condenser exceeds pre-set value;
Temperature at heater unit exceeds pre-set value; temperature at vapor outlet tube does not reach pre-set value within pre-set time period meaning no vapor generation detected within pre-set time period (empty tank detection apparatus); temperature at other monitoring locations exceeds pre-set value; pressure in Distillation chamber exceeds pre-set value; pressure in Distillation chamber does not go down during draining cycle; pressure in Distillation chamber does not reach pre-set value during draining cycle; pressure in Receiving tank does not reach pre-set value during transfer cycle; pressure in air supply exceeds pre-set value; pressure in air supply is below pre-set value; vacuum pressure does not reach pre-set value prior to filling cycle. (Defective Vacuum Generation apparatus failure, Vacuum control valve failure, blocked vacuum passage, vacuum leakage in the apparatus, etc; vacuum pressure does not go down to pre-set value during filling cycle; vacuum pressure does not reach pre-set value during distillation cycle. (Drain valve does not open or drain passage is blocked.); vacuum pressure goes below pre-set value during distillation cycle; distillation is not completed within pre-set period of time. (Safety timer); VOC at monitoring locations exceeds pre-set value; electric power supply is outside of the pre-set voltage value; electric power supply has been interrupted during the operation; compressed air supply has been interrupted during the operation; fluid level in distillation chamber exceeds pre-set value; fluid level in receiving tank exceeds pre-set value; fluid level in distillation chamber does not reach pre-set value during the filling cycle; open circuit detected in Heater Circuit; open circuit detected in cooling apparatus Circuit; open circuit detected in Temperature monitoring apparatus Circuit; open circuit detected in Temperature monitoring apparatus Circuit; open circuit detected in pressure monitoring apparatus Circuit; open circuit detected in operation control apparatus Circuit; safety cover opened during operation.

Provided may be an outer cover (Safety Cover) to ensure maximum surface below 70° C.

Weight of unit may be balanced to attain tip proof to ±15° at 360. Agitation of dirty fluid before transfer to Distillation chamber is achieved by introducing exhaust air of filling pump, by introducing air before and/or during transfer, and/or by mechanical agitation.

Provided may be remote diagnostic and/or control apparatus via internet/telephone line.

Provided is a non-explosion proof cooling fan motor and other electric device housed in explosion proof enclosure. Provided is a stainless Steel Distillation chamber with $1^{st}$ layer of Nickel Aluminum sprayed on to the bottom for adhesion and $2^{nd}$ layer of Aluminum sprayed on for heat conductivity and weldability A vacuum required for filling and/or distillation is provided by Air Operated Pump mounted in-line in fluid outlet flow passage.

The invention further provides:

The ability to set the number of distillation cycles to be performed.

A Safety Max. Timer.

The Apparatus alerts when tanks are empty

Pre-heated Pump Fill or Vacuum Filling

Distillation under Vacuum

Waste may be drained by pressure

Sequence is controlled by computer

Power Interruption control and detection

Use of direct heating system

Structured to meet UL2208, Explosion Proof C1, D1/C1, D2

Explosion Proof Enclosure, enclosing std. Fan Motor, Control, Water Control Valve, Solenoid.

Computer control outside connected by intrinsically Safe Wires

LCD and LED display

Plug (Std.) above 18" high.

Receiving Drum 10" long inside.

Floating Pressure Relief Valve Port

May be air-cooled or water-cooled

Automatic boiling point detection apparatus

Includes an outer cover to ensure maximum surface below 70° C.

Programmable to provide different set-up point and/or heater power strength for each auto-repeating cycle.

Tip proof to ±15°.

I claim:

1. A fluid distillation apparatus comprising in integral unitized combination:
    a distillation chamber comprising a distillation tank, a tank lid, means for sealing between said distillation tank and said lid, at least one opening to which a drain passage is connected, at least one opening through which to introduce the fluid into distillation chamber, and at least one opening through which to let out fluid,
    means for holding said tank lid in closed position,
    means for heating said distillation tank, comprising at least one electric heater element,
    means for minimizing heat loss from said distillation chamber, comprising a means of covering said distillation tank with material which is heat resistant and heat insulating,
    means for relieving pressure higher than a predetermined value from said distillation chamber and passage connected openly to said distillation chamber,
    a cabinet for enclosing all components, comprising outer panels for covering exterior surfaces and inner structural members,
    means for connecting with at least one external apparatus or source of contaminated fluid and with at least one container to receive distilled fluid, comprising at least one each of a fluid inlet port and a fluid outlet part,
    a distillation tank filling system comprising a means for transferring a contaminated fluid from said external source into said distillation tank, wherein said distillation tank is provided with a means for detecting level of fluid in said distillation chamber, wherein said means for detecting level of fluid comprises a combination of a float with a up-right stem, a magnet attached to said stem and a lead switch,
    means for converting fluid in said distillation chamber to vapor through heating process,
    means for condensing said vapor into fluid through cooling process, comprising a condenser fluid flow line between said distillation chamber and condenser,
    means for transferring condensed fluid to a fluid outlet port, comprising a fluid flow line between said condenser and said fluid outlet port,
    a debris draining system for automatically draining debris from said distillation tank, comprising at least one valve for opening and closing drain passage and a means for actuating said valve,
    an electronic control system for controlling distillation process and related functions, comprising at least one microprocessor with memory programmable to perform automatic distillation cycles,
    an electric power control apparatus for providing and controlling electric power supplies,
    means for connecting to electric power source, comprising an electric power cord to receive electric power supply, and
    means for grounding to earth, comprising at least one electrically conductive cord or wire within or outside of said power cord.

2. A fluid distillation apparatus as recited in claim 1 wherein said distillation tank employs direct heating system comprising an electric heater element encapsulated in explosion proof housing which is directly attached to said distillation tank or forms the bottom portion of said distillation tank.

3. A fluid distillation apparatus as recited in claim 1 wherein said distillation tank further comprises a bottom which is sloped toward the center for improved draining of debris.

4. A distillation chamber for use in a fluid distillation apparatus as recited in claim 1 wherein said distillation tank further comprises a inner bottom tapered section and an inner surface coated with Teflon to improve draining of debris.

5. A fluid distillation apparatus as recited in claim 1 wherein a means for generating vacuum is automatically activated to create vacuum in the distillation chamber only when evaporation conditions indicate within a pre-determined period of time the requirement of vacuum to reduce the boiling point of the fluid being distilled.

6. A fluid distillation apparatus as recited in claim 1 wherein said electronic control system further comprises an intrinsically safe computer board, with built-in control switches or with a separate key pad, located outside of explosion proof housings.

7. A fluid distillation apparatus as recited in claim 1 wherein said electronic control system further comprises a computer board located inside of an explosion proof housing and a separate intrinsically safe key pad located outside of said explosion proof housing.

8. A fluid distillation apparatus as recited in claim 1 wherein said electronic control system further comprises said computer board containing one or more microprocessors and one or more LCD and LED displays capable of displaying messages.

9. A fluid distillation apparatus as recited in claim 1 wherein said electronic control system is programmed to allow the operator to select some of distillation parameters including language of display, temperature displayed in Centigrade (° C.) or Fahrenheit (° F.), one or more maximum boiling temperatures, strength of heater power for each boiling temperature set-up, number of automatically repeated cycles, agitation cycle turned on or off, vacuum distillation turned on or off, desired starting date and time.

10. A fluid distillation apparatus as recited in claim 1 wherein said electronic control system further comprises a self diagnostic program to monitor error conditions and, upon detecting error condition, to perform pre-programmed corrective action and to display error messages.

11. A fluid distillation apparatus as recited in claim 10 wherein said electronic control system is programmed to retain status of distillation operation in memory so that, after interruption during operation, operation may be re-started from where it was interrupted.

12. A fluid distillation apparatus as recited in claim 1 wherein said electronic control system is programmed to automatically reduce heater power by pre-determined rate and timing when temperature at said distillation tank reaches close to set point temperature.

13. A fluid distillation apparatus as recited in claim 1 wherein said electronic control system is programmed to enable manual control of said solenoid valves by pressing key switches in predetermined sequences.

14. A fluid distillation apparatus comprising in integral unitized combination:
 a distillation chamber comprising a distillation tank, a tank lid, means for sealing between said distillation tank and said lid, at least one opening to which a drain passage is connected, at least one opening through which to introduce the fluid into distillation chamber, and at least one opening through which to let out fluid,
 means for holding said tank lid in closed position,
 means for heating said distillation tank, comprising at least one electric heater element,
 means for minimizing heat loss from said distillation chamber, comprising a means of covering said distillation tank with material which is heat resistant and heat insulating,
 means for relieving pressure higher than a predetermined value from said distillation chamber and passage connected openly to said distillation chamber,
 a cabinet for enclosing all components, comprising outer panels for covering exterior surfaces and inner structural members,
 means for connecting with at least one external apparatus or source of contaminated fluid and with at least one container to receive distilled fluid, comprising at least one each of a fluid inlet port and a fluid outlet port,
 a distillation tank filling system comprising a means for transferring a contaminated fluid from said external source into said distillation tank,
 means for converting fluid in said distillation chamber to vapor through heating process,
 means for condensing said vapor into fluid through cooling process, comprising a condenser fluid flow line between said distillation chamber and condenser,
 means for transferring condensed fluid to a fluid outlet port, comprising a fluid flow line between said condenser and said fluid outlet port,
 a debris draining system for automatically draining debris from said distillation tank, comprising at least one valve for opening and closing drain passage and a means for actuating said valve,
 an electronic control system for controlling distillation process and related functions, comprising at least one microprocessor with memory programmable to perform automatic distillation cycles,
 an electric power control apparatus for providing and controlling electric power supplies,
 means for connecting to electric power source, comprising an electric power cord to receive electric power supply,
 means for grounding to earth, comprising at least one electrically conductive cord or wire within or outside of said power cord,
 wherein at least one pneumatic apparatus is controlled by an electrically actuated solenoid valve, and
 wherein said electrically actuated solenoid valve is actuated by intrinsically safe electric power and is located outside of explosion proof housings.

* * * * *